Feb. 25, 1936.  J. H. ROBERTS  2,032,098
LONG STOCK FABRICATING MACHINE
Filed Feb. 12, 1931  10 Sheets-Sheet 5
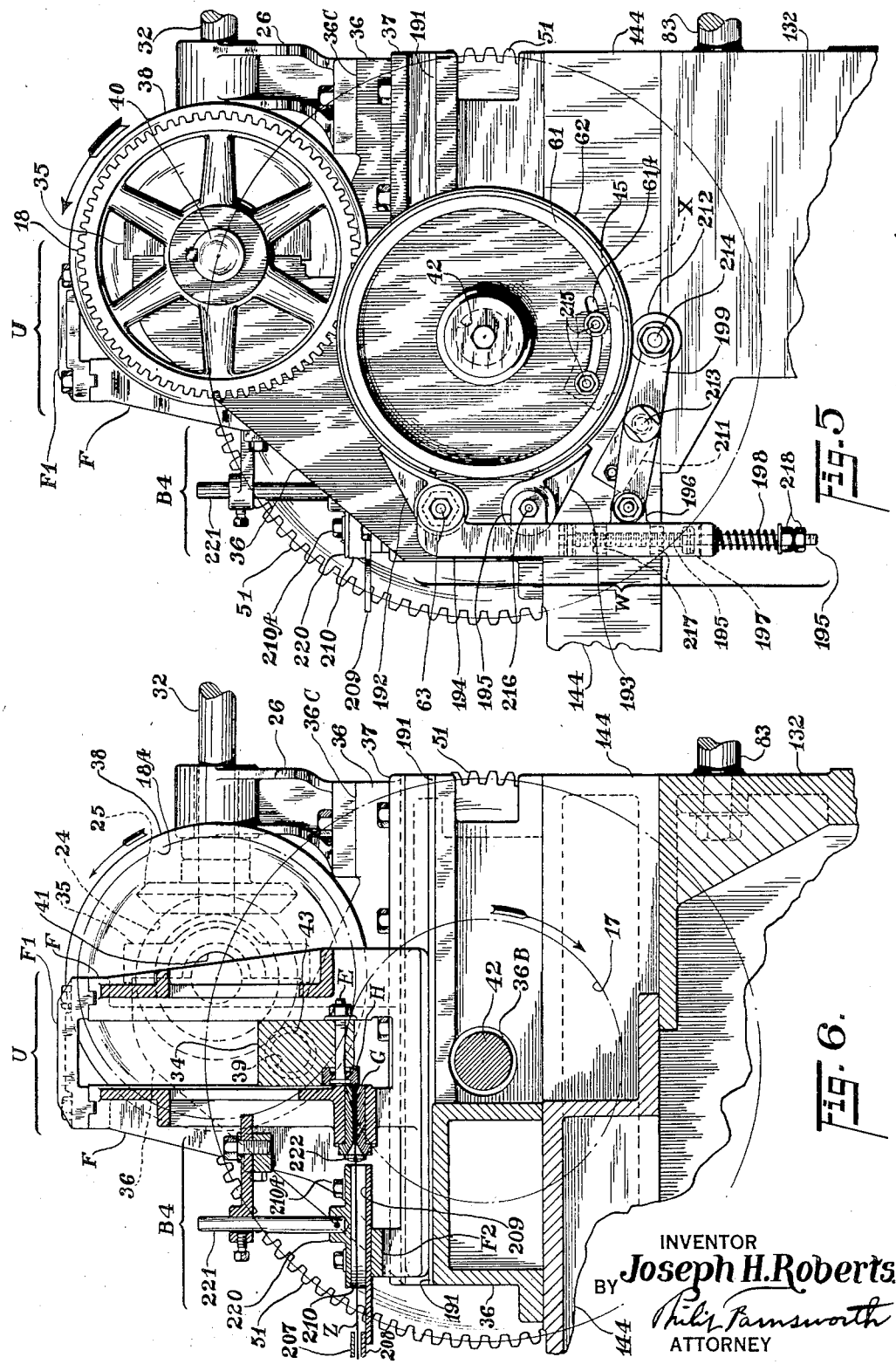
INVENTOR
Joseph H. Roberts
BY
Philip Farnsworth
ATTORNEY

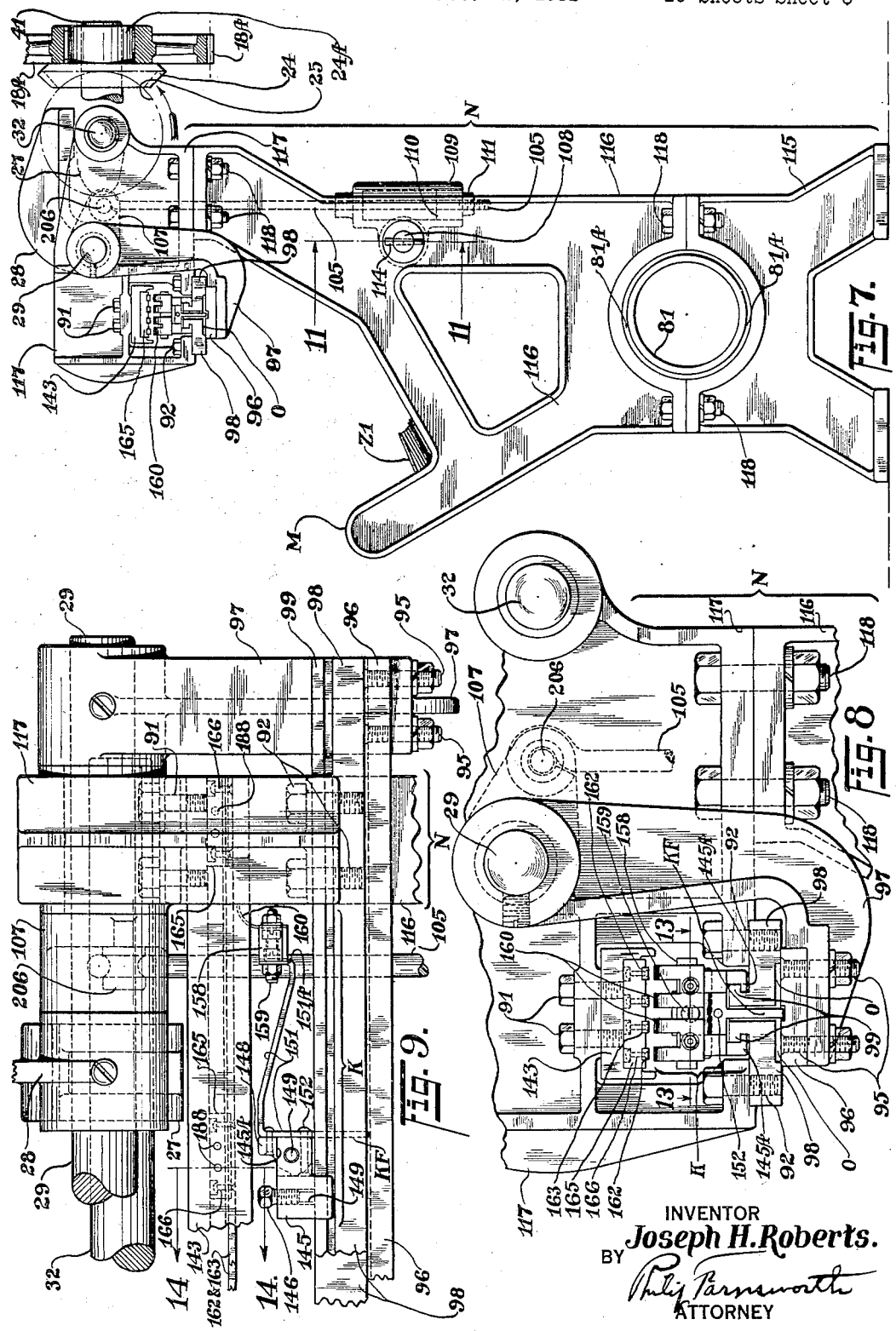

Feb. 25, 1936.                J. H. ROBERTS                2,032,098
                      LONG STOCK FABRICATING MACHINE
                        Filed Feb. 12, 1931      10 Sheets-Sheet 7
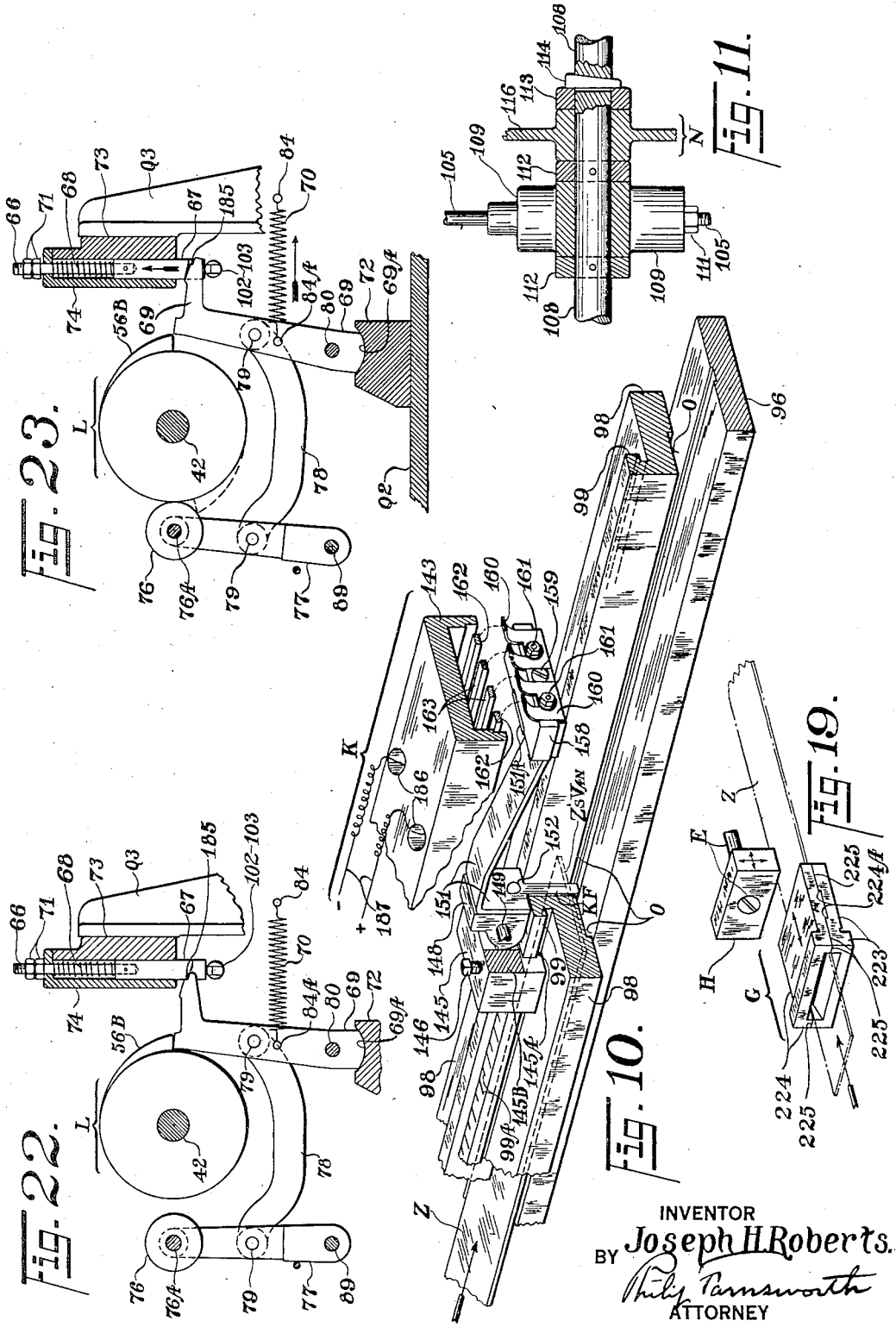
INVENTOR
Joseph H. Roberts.
BY Philip Farnsworth
ATTORNEY

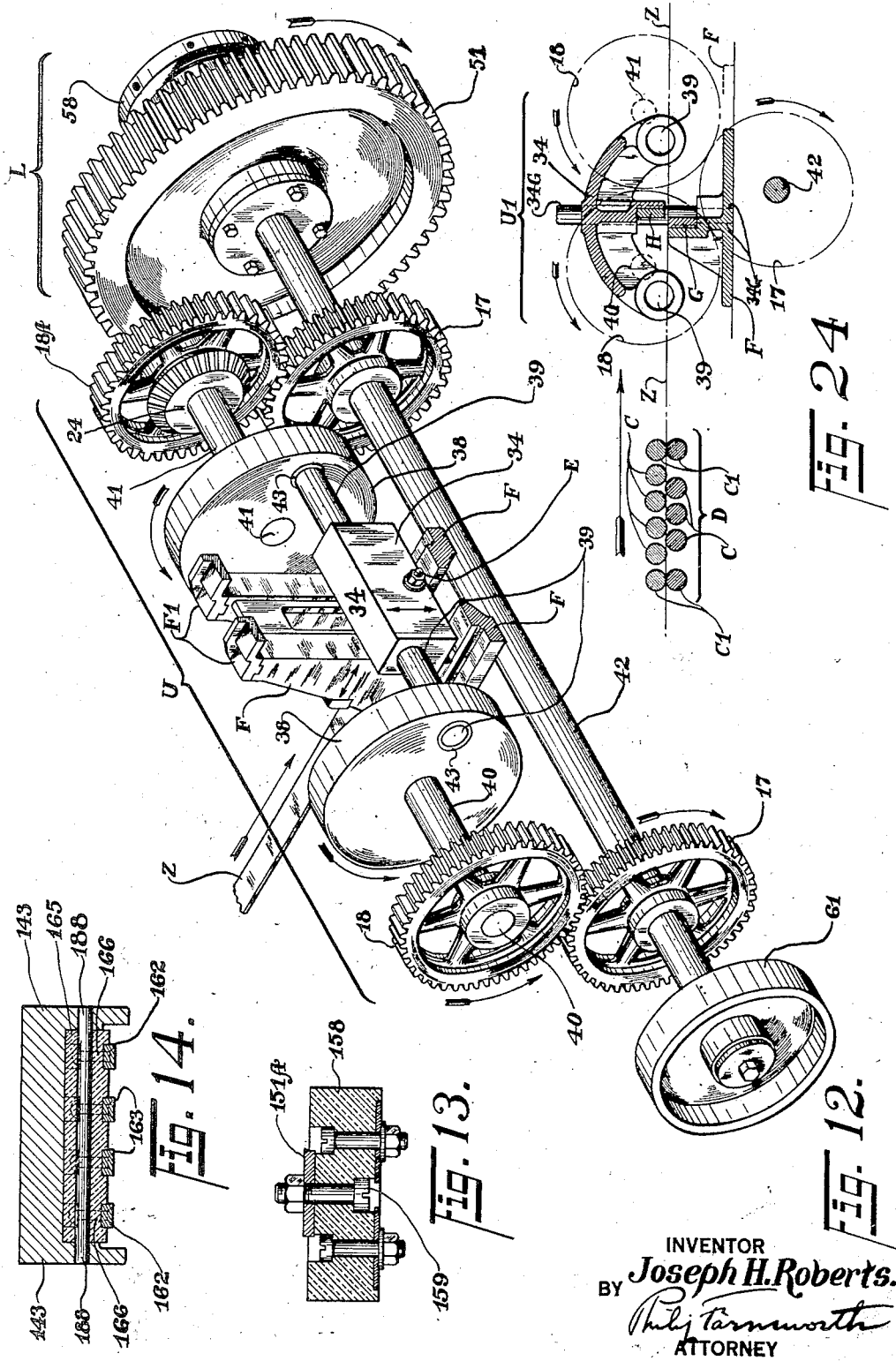

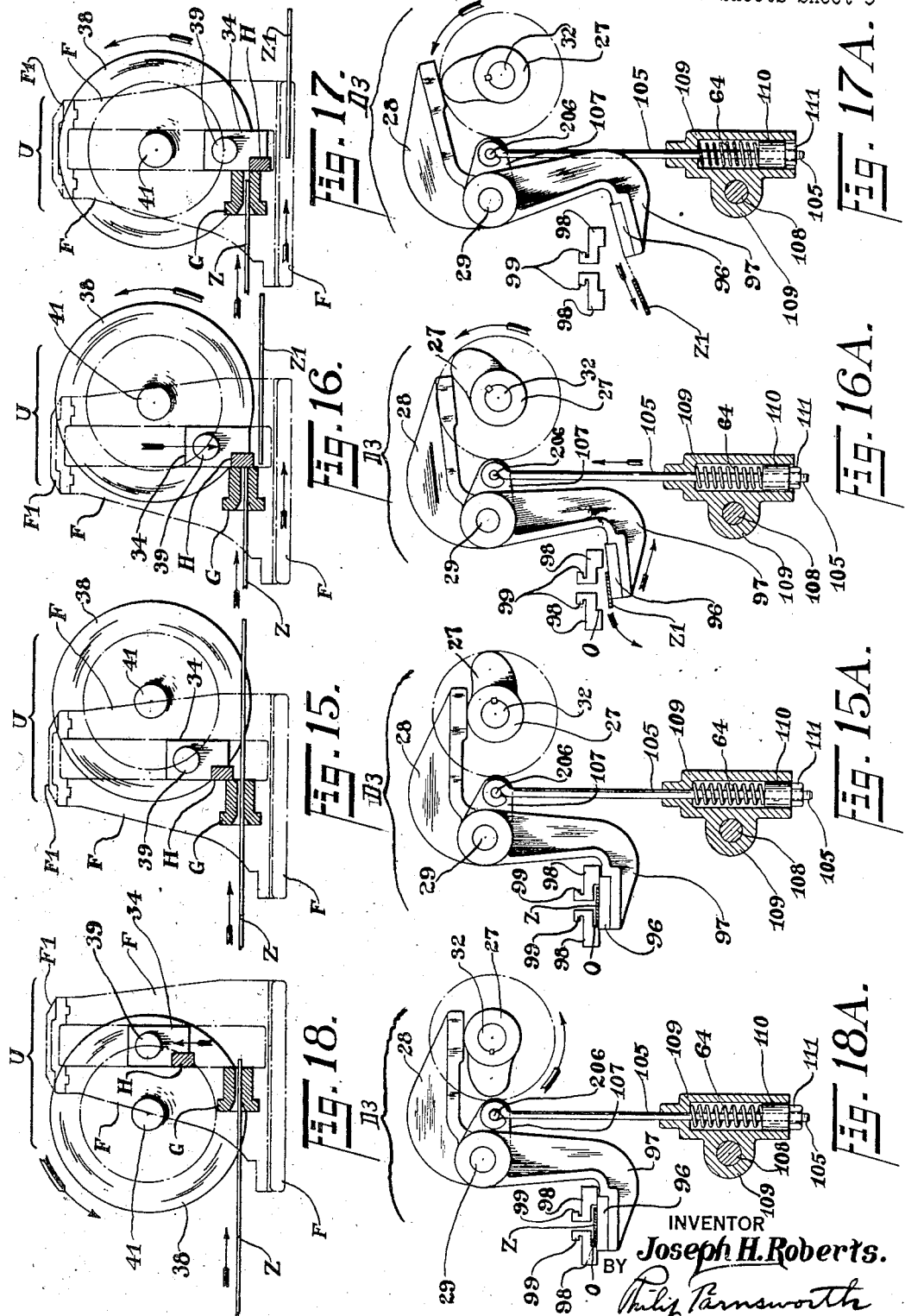

Feb. 25, 1936.　　　　　J. H. ROBERTS　　　　　2,032,098
LONG STOCK FABRICATING MACHINE
Filed Feb. 12, 1931　　　10 Sheets-Sheet 10
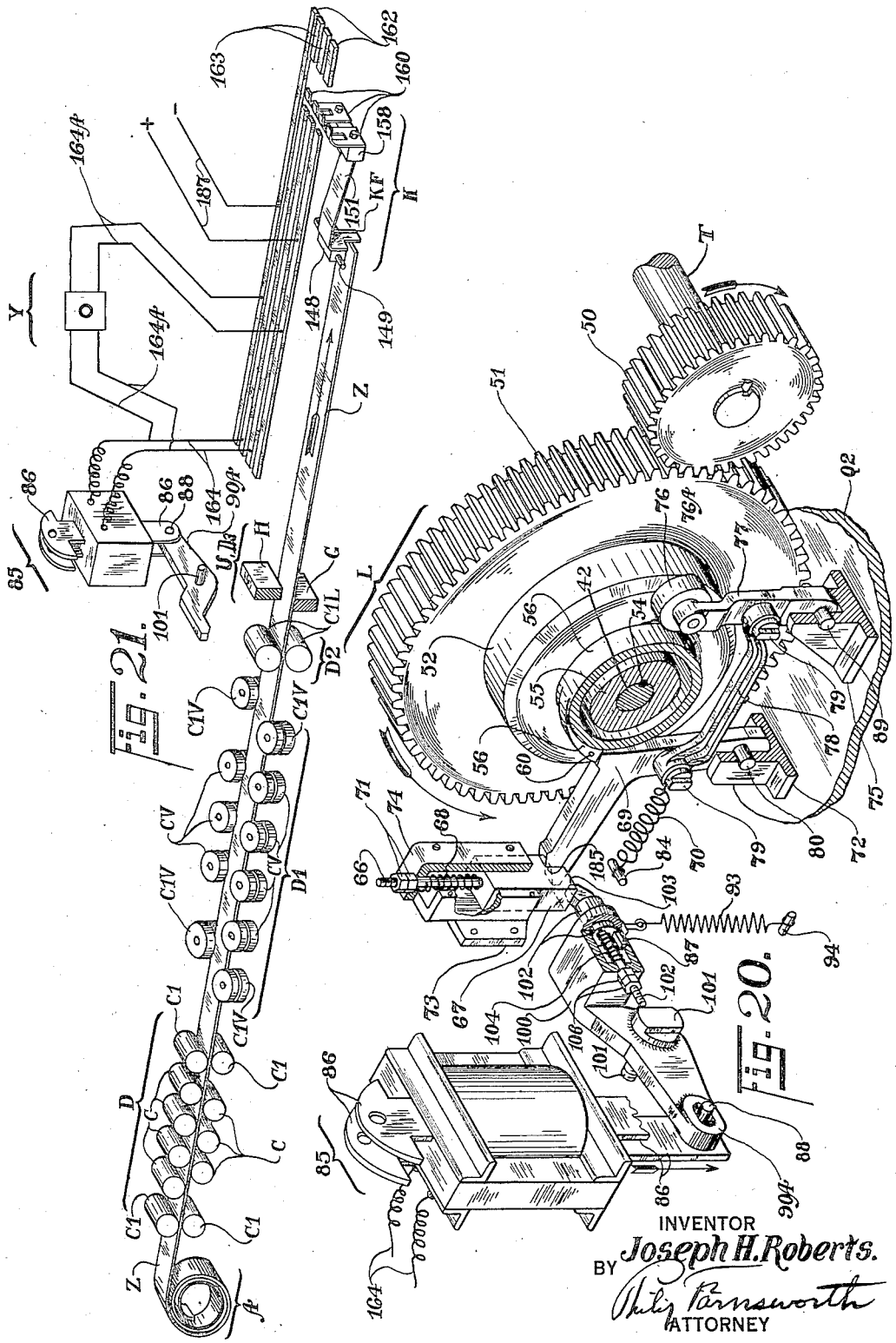
INVENTOR
Joseph H. Roberts.
BY
ATTORNEY Patented Feb. 25, 1936

2,032,098

UNITED STATES PATENT OFFICE 2,032,098

LONG STOCK FABRICATING MACHINE

Joseph H. Roberts, Waterbury, Conn., assignor to The F. B. Shuster Company, New Haven, Conn., a corporation of Connecticut Application February 12, 1931, Serial No. 515,199

48 Claims. (Cl. 164—49)

This invention relates to improvements in flying-shear stock severing mechanisms for fabricating strip-steel of much greater length than breadth or thickness including more or less thick very long metal rod stock whether of polygonal or round cross-section as well as wide sheet-like or narrow rod-like strips of very long steel; the invention relating more particularly to my machine of a type including a plurality of stock treating units which incidentally cooperate to feed the stock, as from a strip which is frequently hundreds of feet long and in a coiled condition, thru and beyond said flying-shear to an electrically operated stock-tripped gauge so arranged and constructed that the successive stock vans each functions to pre-gauge the length and accuracy of the fabricated sub-length of the sheared-stock; the exemplary showing of the invention in the accompanying drawings, Figs. 1–23, being for "flat-wire" stock in the order of three thirty-seconds of an inch in thickness and of two and one-quarter inches maximum width; and the invention relating to structure and other features in combination which co-operate to effect the object of insuring accurate length-shearings of continuously fed stock.

An additional object of the invention is an efficient and reliable and accurately operating machine of the above general class or type, which shall be as simple and of as low cost as may be, considering the method involved, and which will operate at a high production rate.

Referring to the drawings:—

Fig. 1A is an elevation to the right of Fig. 1 illustrating the stock-discharging apparatus portion D3 of the machine;

Fig. 2A is a plan of Fig. 1A;

Figure 1:
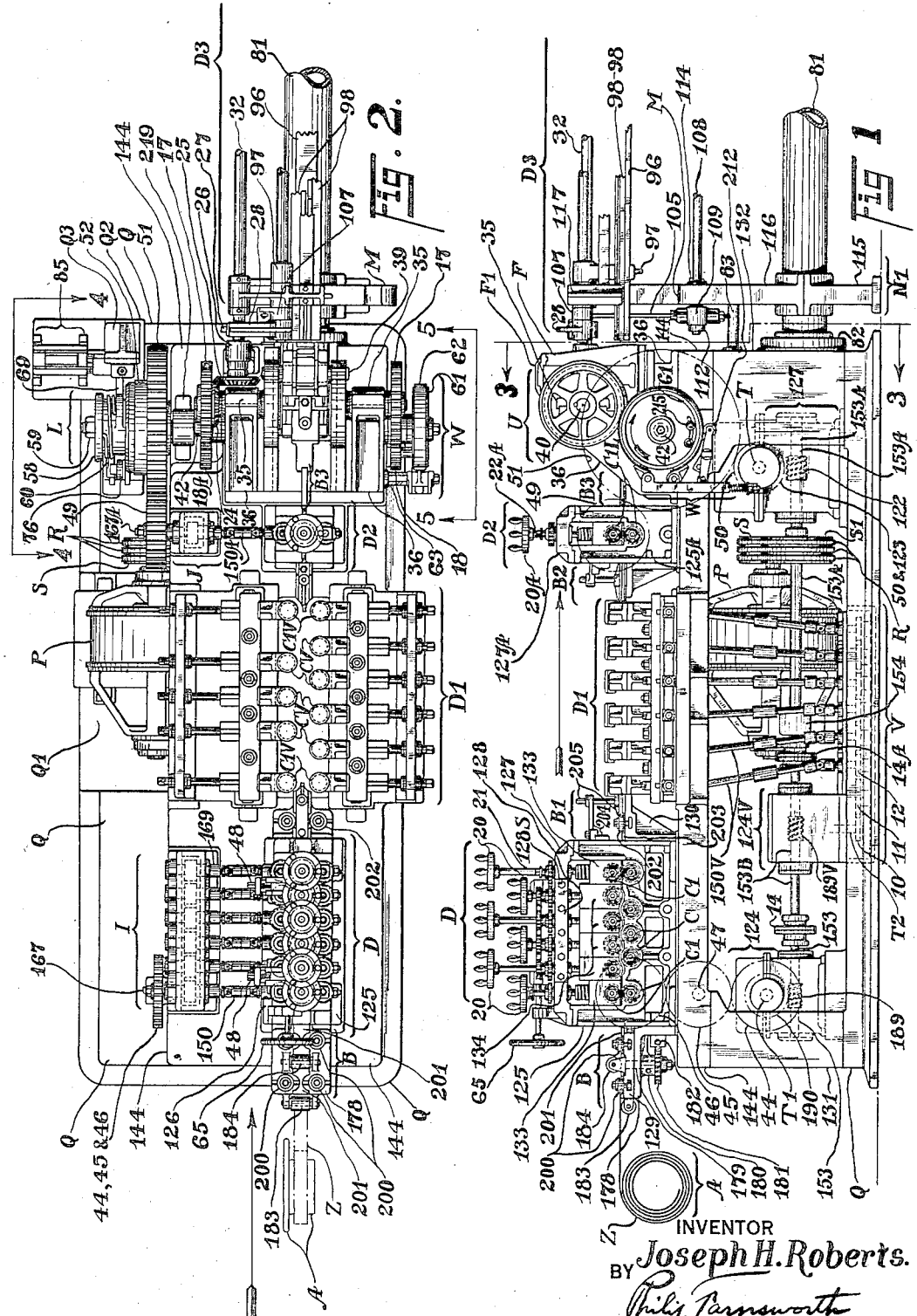
Fig. 1 is a partial front elevation showing the left-hand portion of the exemplary machine, at the right of this figure being the left end of the discharge unit D3 the rest of the length of which is shown in Figs. 1A, 2A.
Figure 2:
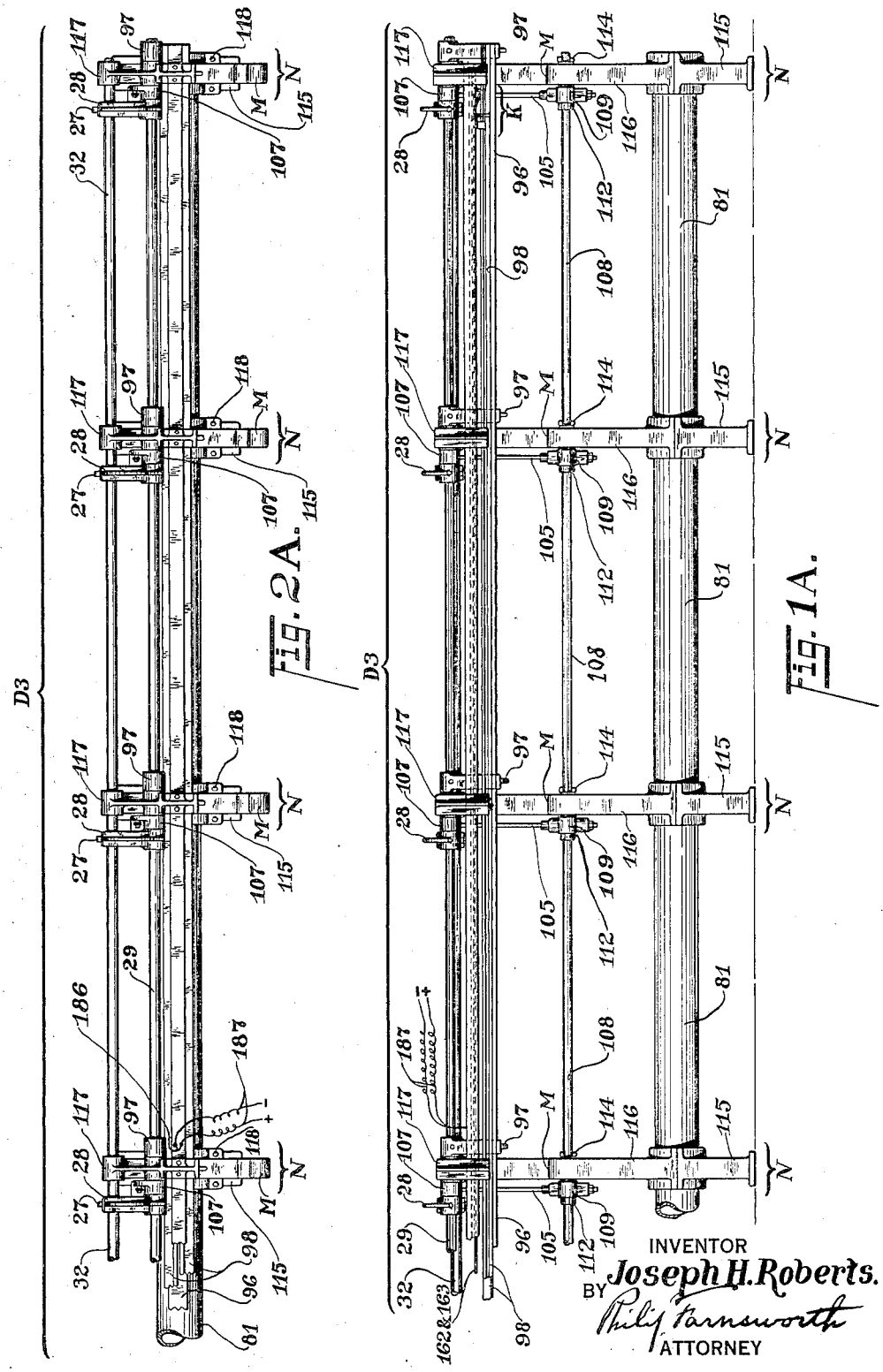
Fig. 2 is a plan of Fig. 1.
Figure 3:
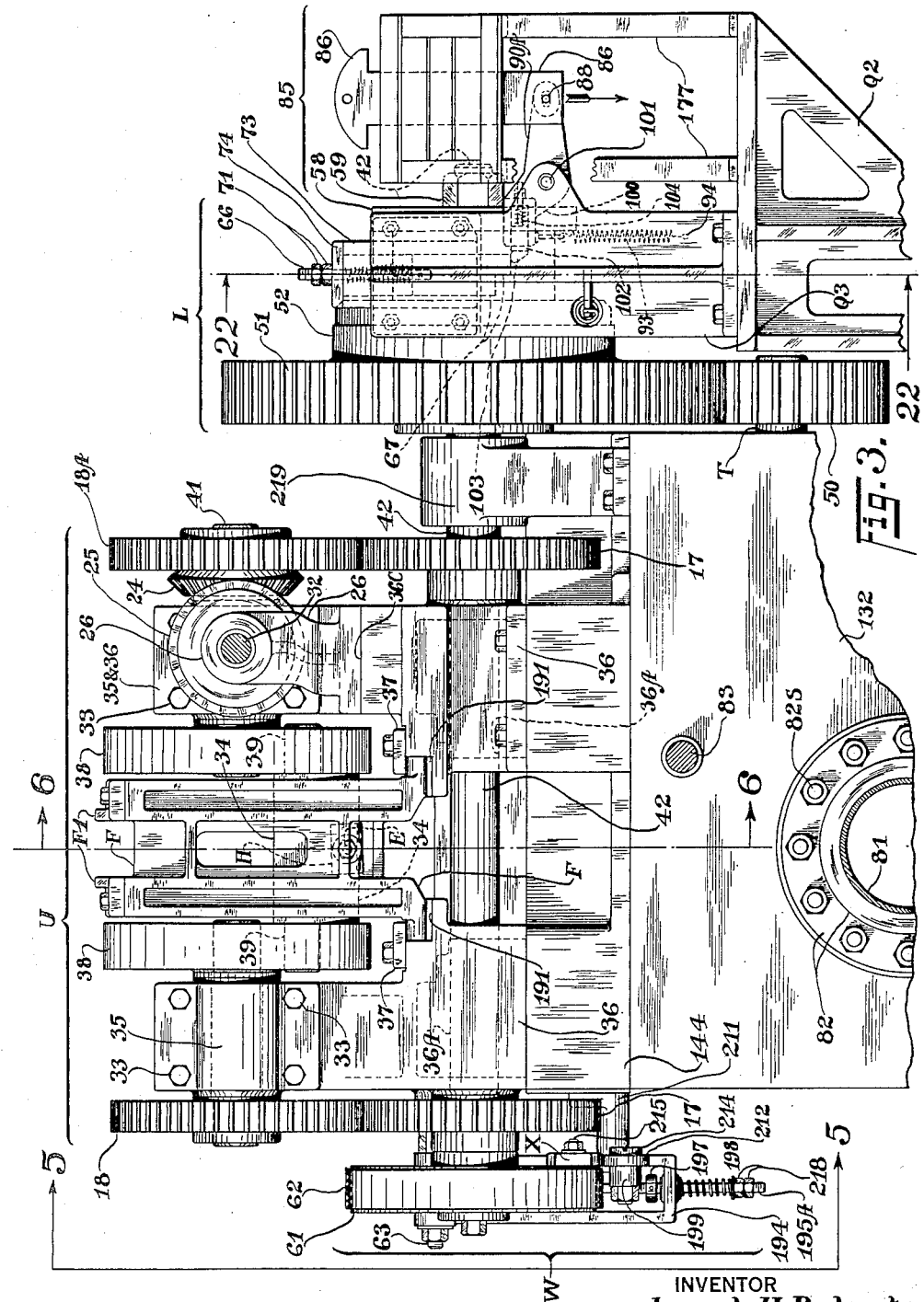
Fig. 3 is an enlarged end elevation partly in section on line 3—3 of Fig. 1, looking leftward from discharge-means D3 toward brake W (left), shear U (middle), and at right, clutch L and clutch-tripping magnet 85.

Fig. 5 is an enlarged front elevation of the brake mechanism W of Fig. 1, viewed from 5—5 of Figs. 2–3; and shows shear-shaft 40 and its gear 18 driven from clutch-shaft 42;

Fig. 6, showing the shear U with blades G, H, is a central vertical section on line 6—6 of Fig. 3; and shows the continuously-running large, heavy fly-wheel gear 51, and crank-arm 38 of which pin 39 drives said blades;

Fig. 7 is an end elevation of the assembled machine, at the right of Fig. 1A, and shows the pivoted stock-discharging member 97 and the discharged cut stock Z1

Fig. 8 is a fragmentary enlargement of the end elevation of Fig. 7 showing in greater detail the end construction of the stock-guides 96, 98, pivoted discharger 97 for bottom guide 96, and the target K;

Fig. 9 is a fragmentary enlarged front elevation of the right of Fig. 1A around the corner to the left from Fig. 8, and showing the stock-guides, target K and the last of the pivoted stock-dischargers 97 at the right of Fig. 1A;

Fig. 10 is a prespective of target K of Figs. 8–9, showing its association with stock Z, the lateral stock-guides 98, 98 and bottom stock-discharger 96, and the electric switches for target K;

Fig. 11 is a fragmentary vertical front elevation on line 11—11 of Fig. 7, showing a mounting for the discharge mechanism D3 at the right of Fig. 1 and in Figs. 1A, 2A;

Fig. 12 is a perspective of the flying-shear mechanism U, showing a portion of the horizontally reciprocating carrier F for blade G, a portion of carrier F being broken away for clearness, the clutch drive-gear 51 being shown at right, and brake-drum 61 at left;

Fig. 13 shows the arrangement of insulation 158, Fig. 10, for the switch from magnet 85 for target K, this Fig. 13 being a section at 13—13 of Fig. 8;

Fig. 14 is a section at 14—14 of Fig. 9 showing, Fig. 10, other parts of the switch for magnet 85 for target K;

Figs. 15–15A to 18–18A are related skeleton views in series which illustrate the anti-clockwise circular path of the cutters or shearing-dies or tools G, H, viewed at four different stages of operation, respectively in Figs. 15–18, with corresponding positions of the stock-discharge cams 27 in Figs. 15A–18A, which act to move bottom stock-support 96 downwardly to discharge cut stock Z1, Fig. 7, against the closing action of the helical springs 64 of Figs. 15A–18A;

Fig. 15 shows the preferred normal zero or preshearing stationary position of the shearing blades G—H, with the crank-pins 39 near 7: 45 o'clock of their rotation which is anti-clockwise as viewed from the front of the machine, Fig. 1;

Fig. 15A shows the companionate normal zero position of the stock discharge cams 27 and stock-guide box 98, 98, 96;

Fig. 16 shows a post-shearing position of the blades G—H with the crank-pins 39 in a different position from Fig. 15 but yet near 7:15 o'clock, just after shearing;

Fig. 16A shows a view showing stock-discharge cam 27 operating at the same time as Fig. 16 to open the stock discharge box 98, 96 to initiate the discharge of the sheared sub-length Z1;

Fig. 17 shows the quick acceleration of blades G—H to positions to right in advance of the freshly formed stock-van, during the time while crank-pins 39 have movements principally horizontal, i. e. in the vicinity of 6:00 o'clock;

Fig. 17A for the same time as Fig. 17, shows stock-discharge cam 27 fully actuated completing dumping the sheared sub-length Z1;

Fig. 18 showing blade H raised clear of the oncoming stock-van as crank pins 39 are revolved upward toward 3:00 o'clock on their way toward their normal position of Fig. 15, i. e., while stock Z is free from blade H to continue its uniform rate of feed to right;

And Fig. 18A, at the same time as Fig. 15A, shows stock-discharge cam 27 at the beginning of its non-operative half-revolution of anti-clockwise return to the zero stationary position of Fig. 15A; bottom stock-support 96 having been promptly returned to stock-supporting position after discharge, Fig. 17A, of cut stock Z1;

Fig. 19 is a perspective showing of the specific form of horizontally-reciprocating die or blade G;

Fig. 20 is a general perspective showing the connections by which clutch L is tripped by the operation of magnet 85;

Fig. 21 is a diagrammatic showing of the relations of various elements of the machine of Fig. 1 as a whole, from reel A at left to target trip K at right;

Fig. 22 is an elevation of the tripping mechanism for clutch L, in its normal latched position, at vertical section 22—22 of Fig. 3, right; this being while the shearing mechanism is in its normal stationary condition of Fig. 15;

Fig. 23 is the same as Fig. 22 but said tripping mechanism in its intermittent unlatched position; this being during the movements of the shearing mechanism in Figs. 16–18; and Fig. 24 is a diagrammatic front-elevational section of a machine embodying a modification of the crank-operated shearing mechanism of Figs. 1–23, this machine being especially adapted for fabricating steel strip stock of an order of widths substantially larger than the "flat-wire" or narrow strips for which the machine of Figs. 1–23 is designed.

The following is an index of the operations, left to right Figs. 1–2, and 21, the operator facing the front and the various controls. The heavy coil or roll of very long steel strip-like stock Z from the mill, and desired to be fabricated into sub-lengths of uniform linear dimensions, is raised from the floor to the dispensing position of reel A. The operator then proceeds to insert the van-end thru the guide-unit B, Figs. 1–2, and into the initial pair, in unit D1 of power-operated pinch-feed rolls C1, Figs. 1, 21, by which Z is power-fed continuously rightward, Figs. 1–2, 21, as long as the machine is in operation, to the pairs of spaced and staggered feed-rolls C, Figs. 1, 21, thru pinch-rolls C1;

Figs. 1, 21, thru the guide unit B1, Fig. 1, into the initial pair, in unit D1 of power operated edge pinch-feed rolls CIV, Fig. 21, whence Z is further power-fed continuously rightward to the pairs of adjustably spaced and staggered edge feed-rolls CV, Fig. 21, thru the edge pinch-rolls CIV, Fig. 21, thru the guide-unit B2, Fig. 1, into the final pair of push-pull feed-rolls CII of unit D2 and out thru the guide-unit B3, Figs. 1, 21, to be received by guide-unit B4, Fig. 6, for final guidance to the shear elements G—H of the fabricating unit or flying shear U; and beyond thru the stock-guides of the discharging mechanism D3, Figs. 1, 2, 15A, 18A, until the van of Z operates the length-master tripping unit K, Fig. 21, to initiate the functioning of clutch L, Fig. 2, (i. e., to unlatch it from Fig. 22 to Fig. 23), to operate blades G—H of the shearing mechanism U thru their cycle, Figs. 15–18, of severing a sub-length from off the treated advance-portion of the parent stock Z and returning to normal stationary condition of Fig. 15; the fresh vans of the parent stock Z so created being continuously fed forward thru the path of their predecessors Z1 to make contact with and to operate the Z1 to make contact with and to operate the length-master tripping unit K, for pre-gauging the linear dimension of the cut sub-lengths Z1.

Stock-guides

The successive stock-guide units B—B4 for guiding stock Z, left to right Fig. 1 from reel A thru to the fabricating unit U and beyond, are severally constructed and function as follows:

The guide-unit B is of special transverse swivel design whereby the stock Z in its entrance from reel A to the stock-treating unit D may be guided to pass longitudinally central and/or parallel between the roll-stand members 125—126 of unit D, Fig. 1.

The guide-unit B is supported by the bracket casting 129, left Fig. 1, which is formed to receive the downward extending vertical swivel-stem 179 of the swivel guide-plate 178; said swivel-stem 179 being fitted with a manually controlled lock 180, Fig. 1, while at its lower extremity there is fitted a worm-gear 181 which intermeshes with a manually operated worm 182 mounted in 129, Fig. 1; which allows the operator to minutely align the direction of Z's entrance thru said unit D.

The swivel-plate 178 of guide-unit B pivoted by 179 in 129 is fitted with the top and bottom guide rolls 183—184, a surface wearing strip 200 and at least one pair of edge guide-rolls 201, Fig. 2, the latter being capable of adjustment towards or away from each other to accommodate the variations of widths of different coils of stock Z which may be selected for treatment in the exemplary machine.

The guide-unit B1, Fig. 1, performs to guide stock Z, as it emerges from the last pair of rolls C1 of unit D, beyond to the first pair of rolls CIV of the vertically disposed unit D1, Figs. 1–2; said guide B1 having its lower components supported from below by the bracket 130, Fig. 1, to which are adjustably fixed the edge guide-rolls 202 and a surface wearing plate 203.

The upper components of unit B1 are supported from above off the roll-stand frames 125—126 by the overhanging ensemble of supporting elements 204 from which supporting-elements is adjustably suspended the top-guide or pressor-foot 205, Fig. 1 which insures the entrance of stock Z to the more or less grooved rolls CIV of the vertical unit D1, Figs. 1–2.

The construction of the stock-guide unit B2 is analogous to that of B1 altho it is not necessarily equipped with the equivalent of B1's edge guide-rolls 202. The function of this guide-unit is to receive stock Z as it emerges from the last pair of rolls CIV of vertical unit D1 and to conduct the same to the push-pull pinch-feed rolls C1L of unit D2, Fig. 1, which feed stock Z into the guidance of unit B3.

Guide unit B3 is constructed mainly of an upper guide element 207 and a like lower guide 208, Figs. 1, 2, 6, each of which guide-elements 207—208 terminates in a narrow rightward extension which cooperative form a birdbill-like guide-structure thru which the continuously moving stock Z is guided to bridge the intervening gap from the rolls C1L rightward to the hollow-die or lower blade G, Fig. 6; all this while the guide-unit B4, which is dually fixed to the blade carrier F, assists in a telescopic manner to interslidingly support the rightward projecting ends of the guide-elements 207—208 of B3, Fig. 6.

The rightward extensions of the guide-elements 207—208 of unit B3 are preferably formed narrow to accommodate the processing of the narrower widths of stock Z which may be as narrow as one-half inch more or less ("flat-wire") so that the cooperating edge-guides 210 of unit B4 may be transversely adjusted to adjacent positions at each side of the said narrow rightward extensions of the guide-elements 207—208 to insure that the narrow strips of stock Z will safely enter the orifice of the hollow-die or lower blade G, Fig. 6; said cooperating edge-guides 210 being preferably fixed to the cover member 220 of guide unit B4 by the cap-screws 210A, Figs. 5–6.

*Power*

All of the foregoing cooperating stock-treating units assisted by the stock guides B—B4 operate in tune to treat and feed the stock Z to and thru the flying-shear elements of unit U and to subsequently produce sub-portions Z1 of uniform linear dimension; and all but reel A are driven by a common driving means such as electric motor P, Fig. 1, by way of a series of inter-connected driving shafts (i. e. the worm-shafts 153—153A—153B of the commercial reduction-units 121, 124 and 124V); all of which are arranged parallel with the line of stock-feed and extend longitudinally of the machine. Reel A may or may not be power-operated, as below.

Figure 4:
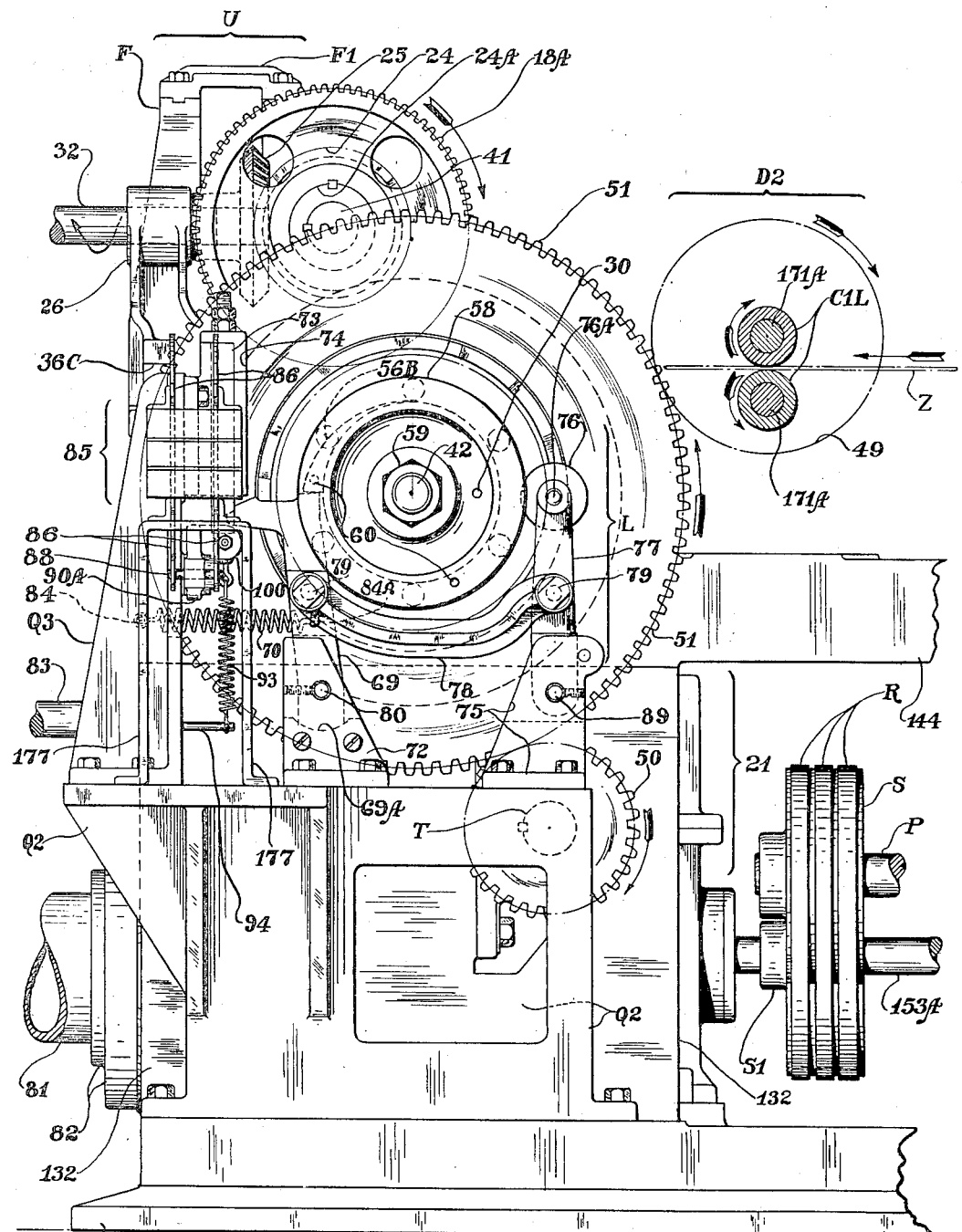
Fig. 4 is an enlarged rear-elevational view from the rear of the left of Fig. 1 looking from 4—4 of Fig. 2; and showing shear U, shear-clutch L, stock-feed D2 and power transmission belt R from main drive-shaft of motor P.

The motor P is positioned on that depressed portion Q1, Fig. 2, of the bed-plate Q partially lying within the general supporting structure of the machine, and is power-connected with the worm-shafts 153—153B via a multi-strand V-belt drive R, Figs. 1–2, 4 and the inter-connecting flexible couplings 14—14A, Fig. 1; said worm-shaft 153A having an additional outboard bearing support 154, Fig. 1, on its long extended portion adjacently positioned to the flexible coupling 14A, Fig. 1.

The power received from motor P is transferred from the driving worm-shafts 153—153B, Fig. 1, to the several operating components as follows:—

(1) From the worm-shaft 153 to the ensemble of rolls C—C1, which are grouped in the preliminary stock treating unit D (upper left, Figs. 1, 21), the power drive is suitably reduced in revolutions per minute by the worm 189 and the worm-gear 190 of the commercial worm-gear speed reduction unit 124 driving rolls C—C1 at an optimum rate of stock feed; said worm 189 being mounted on high-speed shaft 153 and worm-gear 190 on the low-speed shaft T1; both 189—190 being supported within the general housing of the unit 124 and shaft T1 being extended rearward of the reduction unit 124, transversely to drive via spur gears 44, 45 and 46, Fig. 1, Fig. 1, the gear-box ensemble I, top left, Fig. 2, which distributes rotative power via universal joints 150 to the rolls C—C1 of unit D; said worm-shaft 153 being connected with and driven from the worm-shaft 153B by the flexible coupling 14, Fig. 1;

(2) From the worm-shaft 153B to the ensemble of rolls CV—CIV, which are adjustably grouped in the secondary stock treating unit D1 (top center, Fig. 1), the power drive is suitably reduced in revolutions per minute, by the worm 189V and the worm-gear 190V (not shown) of the commercial worm-gear reduction unit 124V, driving rolls CV—CIV at an optimum rate of stock feed; said worm 189V being mounted on high-speed shaft 153B; and worm-gear 190V (not shown) on the low speed shaft T2; both 189V—190V being supported within the general housing of the unit 124V and shaft T2 being extended vertically downwards of the reduction unit 124V, Fig. 1, into the gear-box ensemble V which distributes power to drive, via the spur-gears 10, 11, 12 and the intermeshing idler gears 13 (not shown), Fig. 1, the superimposed adjustable stock-treating unit ensemble D1; this thru the universal joints 159V which are connected to the spindles of the rolls CV—CIV of said unit D1; said worm-shaft 153B being connected with and driven by the worm-shaft 153A thru the flexible coupling 14A, Fig. 1; and (3) From the worm-shaft 153A to the ensemble of the pull-push pinch-feed rolls C1L of the third stock treating unit D2 and to the flywheel bull-gear 51 of clutch L for intermittently operating the flying-shear components of unit U (right Fig. 1), the power drive is suitably reduced in revolutions per minute, by the worm 122 and the worm-gear 123 of the commercial worm-gear speed reduction unit 121, bottom right Fig. 1, driving rolls C1L (and incidentally fly-wheel bull-gear 51) at tuned rates corresponding to the associated stock-treating units D—D1; said worm 122 being mounted on high speed shaft 153A; and worm-gear 123 on the slow-speed shaft T; both 122—123 being supported within the general housing of the unit 121 and shaft T being extended transversely rearward of the reduction unit 121, Fig. 1, to support and drive from the pinion gear 50, Figs. 1, 3, 4, and 20, to the gear-box ensemble J, central right Fig. 2, and the fly-wheel bull-gear 51 of clutch L which incidentally and normally acts only as an idler gear between pinion-gear 50 and the gear 49 mounted on spindle 167A, Fig. 2, of unit J which unit distributes rotative power via universal joints 150A to the rolls C1L of unit D2; said worm shaft 153A being connected with motor P by the multi-strand V-belt drive R, Fig. 1.

*Speeds*

As to speeds, motor P is preferably, but not necessarily, an adjustable speed D. C. motor of from 600 to 1800 R. P. M., and is equipped in the exemplary machine with an 8.8″ pitch diameter sheave pulley S which transmits the motor's power via the multi-strand V-belt R to the 9.9″ diameter sheave pulley mounted on the worm-shaft 153; so that the inter-connected worm-shafts 153, 153A, 153B in relation to the motor are thereby all power driven at a slight reduction in speed which ranges from 533⅓ to 1600 R. P. M.; said inter-connected worm-shafts indirectly driving all the various component units of the machine at substantially reduced revolutions per minute, as follows:

The reduction ratio, Fig. 1, between the two worms 189—189V and their respective worm-gears 190—190V, all of which are supported within the oil-tight casings of the two reduction units 124—124V, is as 1 is to 4⅝; and shafts T1 and T2 for respectively driving rolls C—C1 of unit D and rolls CV—C1V of unit D1 will thereby be theoretically rotated (according to the adjusted speed of motor P) from 110⅓ to 331 R. P. M.; this speed of shafts T1—T2 is incidentally the same as that of the spindles of rolls C—C1 and CV—C1V so that the connecting trains of gearing 44—46 and 10—11 between said shafts T1—T2 and the power distributing units I, V are of a one to one ratio.

Likewise, the reduction ratio, Fig. 1, between the worm 122 and the worm-gear 123 supported within the oil-tight casing of the reduction unit 121 is as 1 is to 3⅝; and shaft T, for driving the rolls C1L of unit D2, is thereby theoretically rotated (according to the adjusted speed of motor P) from 147⅛ to 441⅜ R. P. M.

The differences in the reduction ratio of the above reduction unit 121, contra the before mentioned units 124—124V, is primarily because shaft T must rotate at a sufficiently high rate of speed to drive the combination pseudo-idler flywheel bullgear 51 of clutch L with at least a 1 to 3.2 reduction ratio in the exemplary machine so that said flywheel clutch-member has a rate of rotation (according to the adjusted speed of motor P) in the order of from 46 to 138 R. P. M.; therefore there is incidentally and necessarily a further speed reduction of as 7½ is to 10 between the driving pinion 50 mounted on the rearwardly extending slow-speed shaft T of the reduction unit 121 and the power-receiving gear 49 of the unit J which distributes power to rolls C1L via the universal joints 150A, Fig. 2; all this to maintain the several effected components in tune with the rest of the machine.

Thus it is seen that stock Z is continuously unreeled from A and fed left to right, Figs. 1, 21, for treatment in the roll ensembles D, D1, and D2 continuing on thru the flying shear unit U of the machine and beyond into the stock-guides 96, 98, until the van of Z pre-gauges the linear dimension of a fabricated sub-length Z1 and causes the shearing thereof from the parent stock Z when contact by the van of Z is made with the target-tripping unit K, Figs. 1A, 9, 21.

Stock-reel

The stock-reel A is preferably but need not be of a power-operated type as set forth in my prior application for patent Serial No. 437,305, filed 20 March, 1930, wherein the turntable of the reel, which in the exemplary machine supports the stock coils of Z preferably in the manner shown on a horizontal axis, see Figs. 1–2, 21, is power raised and lowered from the floor by the operator's control of the stock-reel motor.

Feeds

With any such reel-head loaded with a stock-coil and raised to its dispensing position, the operator as outlined before loosens the bindings of the stock-roll Z on A and manually feeds the van end of the coiled stock thru the entrance-guide ensemble B, Figs. 1–2; thence the van of the stock is power engaged by the first pair of constantly rotated pinch-feed rolls C1 feeding Z forward to right thru the several stock treating elements D, D2 to the pull-push pinch-feed rolls C1L of unit D2, Fig. 21.

Feed rolls C—C1, CV—C1V rotating on their several arbors, as well as rolls C1L, are all power operated between the speed-range of 110⅓ and 331 R. P. M.; and all these rolls incidentally treat and feed stock Z at the same rate, which in the exemplary machine is in the order of 75 to 225 feet per minute.

Disassembly

The general design and construction of the exemplary machine is such that any or all of the various reduction units, gear-boxes and stock treating units, including the flying-shear unit U of the machine and the stock receiving and discharging apparatus can be conveniently separated or stripped off from the stationary skeleton of the machine (by such an expedient as the removal of the attaching bolts and dowels) for removal therefrom for repairs or alterations when such become necessary, said detached units being then transportable to the machine-shop which in a modern steel plant may be located a mile distant from the operating location of the exemplary stock-treating machine.

General dimensions

As to proportions, the exemplary machine as depicted in Figs. 1–2A is shown at a reduced scale of substantially three-quarters of an inch to one foot. The work-line of stock-feed is shown as thirty-eight inches from the floor-level. The rolls C, C1, C1L, CV, and C1V have normal work-engaging diameters of two and five-eighths inches. The stock-receiving and discharging apparatus (partially shown at the right of Figs. 1–2 and extended to include Figs. 1A–2A) has a capacity for handling sub-lengths Z1 of stock Z from three up to and including twenty feet long; and this may be varied in construction to have a greater or less length capacity as may be desired by the designer.

The stock shearing unit U has an extreme reciprocatory movement of nine inches which may also be re-proportioned by the designer according to the principles for cutting continuous feed stock at high rates as set forth in my prior application for patent, Serial No. 403,716 filed 31 October, 1929.

Mounting of shearing mechanism

The shearing mechanism U, Figs. 1, 3–6, 12, 15–18 for fabricating continuously fed stock, also constructed as a detachable-unit, is mainly built up and supported by the steel frame casting 36, Figs. 1, 2, 3–6, which is mounted on the table-support member 144 at upper right in Fig. 1; and only the one-revolution clutch shaft 42, Figs. 2, 3–6, requiring additional support, as by the bearing support member 219, Figs. 2, 3, which is fixed to the top of the end-pedestal 132, Fig. 3, adjacent the overhanging elements of clutch L as at central right in Fig. 3; said shaft 42 being journaled transversely in the frame 36 at 36A—36A, Fig. 3, in a plane below both the stock-line of Z and of the horizontal reciprocating blade-support F, Figs. 3, 6; said journals 36A for shaft 42 being suitably lined with bronze bushings 36B as shown centrally in Fig. 6.

Shearing mechanism U

The shear-shaft 40, 41, Fig. 12, and clutch shaft 42 are normally at rest, being so held under the influence of the brake mechanism W, Figs. 1, 2, 3, 5, while the flywheel bull-gear 51 of clutch L, Figs. 2, 3, 4, 5, is rotated idly on clutch-shaft 42 by motor P without connection to said shaft, until the van of the parent stock Z, acting thru the target-switch unit K, Fig. 10, causes the coils of the solenoid electromagnet 85 to be energized for tripping the clutch L with the resultant locking of the clutch to shaft 42 for a single rotation which, Fig. 12, thru the gears 17—18, 18A of equal diameters, causes the short shafts 40—41 and their crank-arms 38 to make one revolution, causing one revolution of crank-pins or trunnions 39, and a single cycle of the flying shear elements F, G, 34, and H, to shear a sub-length Z1 from off the continuously fed parent stock Z; element F carrying blade G, Fig. 15, element 34 carrying blade H, and the horizontal component of the revolution of element 34, by interconnection with carrier F, causing horizontal reciprocation of the cutter and its blade G; and said operation by short shafts 40—41 of said shear elements being effected thru the crank-arm members 38—38 which are transversely bored and fitted with hardened steel bushings 43 near their ends to receive the pins or trunnions 39 of bronze blade-carrier 34; this transverse boring of the crank-arms 38 in the exemplary machine having an eccentricity (or throw) of four and one-half inches from the centers of shafts 40, 41, imparting a nine inch throw to the elements F, G, H and 34, the speed of operation of the machine being determined and controlled by the length of such throw. Thus carrier 34 for blade H is revolved but not rotated by crank-arms 38, and carrier 34 in said revolution and its reciprocation of carrier F for blade G, reciprocates up and down between the adjacent guide-faces of F. In Fig. 12 the G-carrier F is broken away to show clearly the H-carrier 34 and trunnion pins or crank pins 39; F being shown complete in Figs. 6, 15–18 including two uprights F, F spaced apart fore and aft in the direction of stock-feed and held by top-piece F1, the horizontal space between F, F, being filled fore and aft by H-carrier 34 which slides up and down beneath top F1 along the facing inner vertical surfaces of said uprights F. Thus Figs. 12, 15–18, as pins 39 (loosely connected to either 38 or 34 as desired) are revolved by arms 38 in a fore and aft circle along the line of stock-feed, anticlockwise (when 34 normally lies above the work-line or line of stock-feed) the horizontal components of the motions of pins 39 cause them to exert a push-pull effect on G-carrier F (on uprights F, F) to reciprocate said carrier horizontally; and the vertical components of the revolution of 39 are permitted by the freedom of H-carrier 34 for its up and down reciprocation between the uprights of G-carrier F below top F1.

An important advantage of the above crank-arm-and-pin shear-operating mechanism is its inherent light-weight construction which is important as one of the features which make practicable the hereinafter described accurate production operations of the machine. While crank-pins 39 may be operated from shafts 40, 41, Fig. 12, by way of any suitable crank-wheels or crank-disks on said shafts, including mounting of pins 39 on gears 18, 18A or on crank-arms 38 in the form of disks, yet preferably pins 39 are mounted on parts other than gears 18, 18A, and for the purpose of providing a lighter construction in which the crank-arm-and-pin construction is inherently capable of embodiment, the crank-arms 38 instead of being coupled disks may be in the form of single radial arms extending from the short crank-shafts and having no more mass than is desirable to withstand the shearing stresses.

Fig. 15 shows the normal conditions of rest as determined by clutch L, by the connections therefrom to pins 39, Fig. 12, and by brake drum 61, Fig. 12 of brake W, Fig. 5; crank-pin 39, Fig. 15, being at about 8 o'clock (hour-hand criterion) of the anti-clockwise rotation of its crank-wheel 38 (or preferably as near to 8 and as far from 12 o'clock as practicable) pins 39 holding blade H only slightly above the horizontal stock-passage thru channeled blade G, Fig. 19, in readiness for prompt shearing cooperation between tools H and G by rotation of crank-wheel 38 forthwith upon commencement of downward movement of H caused by the abutting of the advanced right van of stock Z, Fig. 10, against target K, Fig. 21, operating the electromagnet 85 and the connections, Fig. 20, to clutch L, to unlatch said clutch from the locked condition of Fig. 22 to the shear-operating condition of Fig. 23, and connect constantly running fly-wheel gear 51, Fig. 3, to clutch-shaft 42, Fig. 12, and impart a single rotation to shafts 40, 41, gears 18, 18A and crank-wheels 38, a single revolution to crank-pins 39 and H-carrier 34, and a single complete reciprocation to G-carrier F,—brake W, Fig. 5, with its drum 61, Fig. 12, assisting the inertia of the parts in stopping them in their normal positions of rest in Fig. 15.

In preferred construction and operation, the revolvable tool H first moves toward stock Z, Figs. 15–16, immediately effecting shearing after starting from its normal position of rest, then it moves upwardly, from 6 to 12 o'clock anti-clockwise, and finally completes its single revolution by moving downward from 12 o'clock. During all of this revolution of tool H after shearing, the stock-feed continues, but there is but little stock-feed before shearing after the start of the revolution of the tool.

Of such complete cycle, Fig. 16, contrasted with the normal stationary conditions of Fig. 15, shows the positions of the parts after the short anti-clockwise arc of movement of pins 39 from about 8 o'clock, Fig. 15, thru the commencement of shearing at about 7:35 o'clock (hour hand of clock) to just beyond the completion of shearing at about 7:25 o'clock; the sheared sub-length Z1 as a whole, Fig. 16, having been started at the proper time after completion of shearing, in its discharging movement from its position causing desired continuation of operation of shear-clutch as L, the discharger in the example here being by quantity, Fig. 16A, consequent upon the depression of guide-bottom 96 by cams 27. In this clock analogy, each clock-dial minute over which tool H moves is an arc of six degrees, and five minutes of the clock-dial is an arc of thirty degrees; so that the above specified arc of actual shearing movement of revolving blade H (like a clock hour-hand) from about 7:35 to 7:25, being one sixth of the five-minute clock-dial, is thru an arc of five degrees, in the machine in the form designed for shearing narrow strips, the circle of revolution of tool H having a diameter of about four and one-half inches as described above, and the vertical movement of tool H during its five degree shearing arc of its revolution being about three-tenths inch or a little less.

The van length of stock as a whole is held in its position in the line of stock-feed as long as is desirable for providing by it for the operation of the clutch L, and while such van length may or may not be so held for a substantial time interval after completion of shearing, it is so held at least up to the completion of shearing, altho in the machine and roll-locking clutch L disclosed, the sheared stock-van is discharged relatively instantly upon the completion of shearing so that clutch L is released from control by the stock before the blades have been returned to their normal positions of rest. The five degree shearing arc from 7:35 anti-clockwise to 7:25 (hour-hand) centralized at 7:30, is that of the progressive action of blade H transversely across the width of the strip stock, blade H being inclined for that purpose at a raking angle transversely, the shearing beginning at the lower transverse end of raked blade H and continuing progressively across strip stock Z until the higher transverse end of blade H has completed the shearing. This shearing-arc of about five degrees of revolution of crank-pins 39 from 7:35 to 7:25 o'clock is the time when the horizontal and vertical components of the revolution of said pins are such that the rate of rightward motions of blades G, H (which rates are alike at all times, since the blades have interconnected carriers) are substantially the same as the rate of rightward feed of stock Z by the feed-rolls, so that during the act of shearing the stock the latter is kept free from resistance to its intended uniform rate by means of the feeding mechanisms D, D1, D2, of Fig. 21. Further comparing Figs. 15-16, there is a desirably short arc of motion of blade H between its positions of rest and shearing, and as shown and preferred, the normal rest position of H is in the path of its motion directly toward the stock; and preferably there is minimum downward motion of blade H between the time it starts to move from rest in Fig. 15, (preferably as low down toward 8 o'clock as is practical), and the time G and H have sheared, just prior to Fig. 16; the important advantage of this short time between tripping of clutch L to start H from rest in Fig. 15, and the shearing, being that it eliminates all possibility of substantial departures from uniformity of linear dimensions of sub-lengths Z1 which might result if slippage should occur between stock Z and feed-rolls D, D1, D3 during a relatively long interval of time between initiation of movement of blade H and the shearing cooperation of G and H. While said feeding means itself operates at a uniform rate and is intended to feed stock Z at a uniform rate, yet it has been found to be impracticable to insure continuous uniformity of feed-rate by the pinch-rolls because at best the engagement between the stock and such feed-rolls is one of friction, and the stock is heavy, its rate of feed is desirably rapid, and at times the uniformity of stock-feed rate may be more or less interrupted. In the combination of the machine, however, the sub-lengths Z1 will be substantially equal even if at any time there may be unintended variations of stock-feed rate by slippage between stock Z and feeds D, D1, D2, because, clutch L, not being tripped nor blades G or H started from their positions of rest in Fig. 15, until the van of Z strikes target X, thereupon the shearing is effected substantially instantly (between Figs. 15 and 16) before any possible feed-slippage can affect the relations between the feeding stock Z and revolving blade H; i. e., the vertical and horizontal positions of H are such, Fig. 15, preferably at about the 8 o'clock position of crank-pin 39 or as low down toward 8 o'clock as is practicable, that upon the tripping of clutch L, blade H requires movement over only about twelve and one-half degrees of arc (anti-clockwise from 8 to 7:35) before blade H engages with stock Z; and during the extremely short time of that movement of H from 8 o'clock or thereabout before commencement of shearing at 7:35 it is impossible for feed-slippage to occur to an extent sufficient to affect materially the length of cut stock; and as soon as blade H commences to pass down across the stock-passage thru blade G, the crank-wheel 38 via the start of blade H to shear stock Z, positively prevents reduction of feed-rate of Z. But during the twelve and one-half degrees of arc of preliminary movement of blades G, H from 8 o'clock prior to contact of H with Z at 7:35, said blades have ample time for their rate to be accelerated to the rate of stock-feed, under the impulse of the moment of inertia of continuously rotating heavy fly-wheel gear 51, because from 8 o'clock on, anti-clockwise, the rate of horizontal movement of G and H is increasing rapidly, their acceleration rate in horizontal direction being maximum at 7:30; altho throughout the five degree shearing arc, from about 7:35 to 7:25, the range and rate of downward movement of blade H are sufficient, and sufficiently like the rate of stock-feed, for proper shearing; and furthermore, as soon as tool H has started to shear the stock it cooperates with the feeding means in forcing the stock to move lengthwise. During the short five degree shearing arc, 7:35 to 7:25, the horizontal rates of G and H are substantially the same as that of Z; and there is substantial equality of both the horizontal and vertical rates of revolving blade H. By all the above, insurance thus is provided against shearing of too short sub-lengths Z1 due to shearing action delayed after starting of the clutch so long as to permit reduction or intermission of stock-feeding prior to shearing and after starting of shearing tools from rest.

On the other hand the stopping and holding of the light-weight, intermittently operated shearing mechanism in its normally stationary positions of Fig. 15, by means of braking mechanism W (in cooperation with the single-revolution operation of the light-weight construction of crank-arms 38 and crank-pins 39) prevents the revolution of blade H from blocking the normal feed of stock Z by feeds D, D1, D2, as follows.

In any design of machine embodying the invention the constructor should take advantage of the above crank-shaft-arm-and-pin actuating mechanism, particularly in employing crank-arms 38 in the form of simple light-weight radial arms instead of complete disk crank-arms, in order to prevent the possibility of the above stock-feed-blocking by tool H which might occur otherwise and if the masses of the shear-operating mechanism were large enough to cause such high momentum as to cause the tool H, etc., to "creep", in successive cycles gradually and cumulatively, beyond the desired positions of rest close to the shearing positions, so that eventually tool H might be brought to rest by brake W in a position of rest corresponding to the position of initial shearing or even in front of the stock in case of such temporary discontinuance of stock-feed as might permit such movement of tool H into the stock-path. And while it is desirable, as above, to have the position of rest as close to the shearing positions as is practicable, yet it is at least equally desirable to have the normal position of rest far enough from the shearing positions to allow for the desired acceleration of tool-movement after being first moved from positions of rest. In Fig. 16, when the shearing has been completed by the movement of pin 39 anti-clockwise beyond 7:25, the rate of acceleration of the horizontal movements of G and H begins to increase very rapidly, so that as soon as shearing has been completed, Fig. 16, the rightward rate of G and H begins to be higher than that of the feed of Z, so that the van of Z, even if continuing to progress at full rate uniformly rightward, and not slipping in D, D1 or D2, lags behind G and H; so that by the time the rightward movement of G and H begins to decelerate, Fig. 17, i. e., when pin 39 begins to pass rightward from 6 o'clock, the stock-van is safely behind blade H, to left, Fig. 17, and does not catch up to the right end of blade G until such rightward movement of 39 beyond 6 o'clock has raised blade H up out of the horizontal path of stock Z, which is when 39 has moved up almost to 4 o'clock, and when 39 has reached 4 o'clock, blade H will be at the same height as in Fig. 15, altho thereafter, Fig. 18, H will continue upward movement after Z has caught up with and emerged from the open right end of blade G, the upward movement of H continuing until pin 39 has reached 12 o'clock. While the feed of Z continues and clutch L remains unlatched, Fig. 23, L continues to cause the anti-clockwise rotation of crank-wheel 38, from 12 o'clock, Fig. 18, thereby reversing the direction of horizontal movement of G-carrier F causing blade G to slide along its ways backward along stock Z until both G and H are stopped by the unlocking of clutch L, Fig. 22 at mid-rotation of the clutch, and by the action of brake W on shaft 42, in the normal positions of rest in Fig. 15 where as before they are ready for substantially instant shearing action upon the next unlatching of the clutch trip mechanism caused by the fresh van of stock Z striking target K. And throughout the time when crank-pin 39 is being given one revolution from Fig. 15, thru Figs. 16–18 back to Fig. 15, stock Z continues its rightward feed toward target K, desirably and intentionally at a uniform rate continuously; but even if that rate vary, either accidentally or intentionally, the stock Z will be sheared into equal lengths for the following reasons, owing to the cooperation between the target K, and the arrangement of crank-pins 39, and preferably the electromagnet linked between the target and the clutch. First, the sub-length control by target K insures that the shearing tools shall not act until the portion of stock Z which actually has been fed (even if the feed-rolls have slipped on the stock), is equal at least to the length intended and in accord with the adjusted setting of the target relative to the scale 99A, Fig. 10. But such setting of target K in any case must be relative to the time between the instant when the stock strikes the target and the instant when thereafter tool H starts to shear. Assuming a desirably rapid stock feed rate of 200 feet per minute, a substantial length of stock is required to be fed continuously at a uniform rate by the feed rolls, during the time between such instants, in order to obtain the desired sub-length for a given setting of the target; and even if less than such given length of stock be fed during the time after target operation, the shearing tools will operate pursuant to the tripping of clutch L by the target, and a sub-length Z1 will be produced which is shorter than that intended by the target adjustment. Thus, altho a target control of the clutch tripping insures that the clutch shall not be tripped at an arbitrary time independent of the length of stock actually fed, nevertheless the mere provision of a target does not of itself prevent substantial variations of sub-lengths Z owing to possible irregularities of stock-feed after target-starting by the van of the stock. The present invention provides for uniform lengths Z1 even if there be slippage between stock and feed-rolls after the van of the stock Z strikes target K, this being done by substantially eliminating the time interval between such striking and the instant when the low end of raked blade H has started shearing at one edge of strip Z; for as soon as the latter is started, inclined blade H in its action of shearing progressively across strip Z will feed the latter along with the blades G and H until shearing is completed, thereby overcoming any tendency to slippage between the stock and its feed-rolls. Part of the time between target-starting and shearing-starting (i. e., the time between target-starting and clutch-tripping and starting) is eliminated by the provision of the above target-controlled electromagnetic means for mechanically tripping clutch L, this gaining time by eliminating mechanical linkage between target and clutch which otherwise would be needed and which would consume a longer time for their operation to trip the clutch. For this reason the magnet 85 or the like preferably is employed; but whether or not it be employed, or any equivalent means for reducing the time between target-starting and clutch-starting, the remaining time, i. e. between clutch-starting and actual shear-starting is desirably substantially reduced by means of the above arrangement, including flywheel gear 51, whereby the shear-blades are most rapidly accelerated from a position of rest so near to their actual shearing positions that there is substantially no time for either stock-feed or stock-slippage relative to the feed-rolls, the actual shearing occurring substantially instantly upon target-starting, particularly when as preferred, the time between target-starting and clutch-tripping is substantially eliminated by the provision of the electromagnetic clutch-tripper or an equivalent. As in the arrangement of Figs. 6, 12, 15, etc., it is preferable that the normal positions of rest of crank-pins 39 and tool H shall be such that their initial movements shall be in the same vertical direction as their movements during actual shearing, i. e., that said normal positions shall be between 12 and 6 o'clock of the anti-clockwise rotation; and it is preferable that such positions shall be as far from 12 o'clock toward the shearing positions as is practicable in consideration particularly of the matter of acceleration by flywheel 51 of tool H so that the latter at the time of shearing shall have its full rate which is designed to be the same rate horizontally at the time of shearing as the rate of feed of the stock.

The above references to clockwise rotations are on the basis of the location of the shear-parts above the work line as is preferred. If, however, the shear parts be located below the work-line, so that blade H has its shearing movement opposed to gravity, then the rotations of crank-wheels 38 will be clockwise, and the above references to 8 o'clock, 7:35 and 7:25 will be 10 o'clock, 10:25 and 10:35, etc. In any case the above figures are exemplary only, altho theoretically optimum, and it is permissible not only to have longer times between blade-starting and shearing, but to have shearing centered at other times than 7:30 or 10:30. In any case the parts are coordinated in manufacture for shearing action during the quarter-cycle of pins 39 and tool H adjacent the stock in which cycle the tool H is moving toward the stock and also in the direction of stock feed, the shearing being preferably in the middle of said quarter cycle; and preferably the positions of rest are in the same quarter-cycle altho the positions of rest usefully may be in the same half-cycle of movement of 39 and H toward the stock wherein tool H starts from rest and completes shearing all in a single short sweep toward the stock, the use of such arrangement depending on a not too high rate of stock-feed and the degree of uniformity of sheared sub-lengths desired.

Various mechanisms can be employed for increasing the rate of tool H so as to obtain the valuable desideratum of as high a rate of stock-feed as is otherwise practicable. In the first place the throw or eccentricity of crank-pins 39 can be increased so as to provide a greater rate for tool H without increasing the rate of clutch-shaft 42. (With clutches of the roll-locking type shown, a very high rate of rotation is undesirable.)

Another design involves pairs of intermeshing gears 17—18 and 17—18A, Fig. 12, in the form of elliptic gears, i. e., having a pitch-line of elliptical shape. These two gears of each pair are of equal size, and each has its rotation center either at a focus of the pitch-line ellipse as commonly with elliptic gears or otherwise in this particular employment of elliptic gears, at the will of the designer. With two of such elliptic gears so mounted at 17, 17 on shaft 42 which drives crank-pins 39, Fig. 12, and two more such elliptic gears 18, 18A on driven shafts 40, 41, said driven shafts have imparted to them a higher rate during the quarter-cycle of shearing, Figs. 15-16, so that the rate of stock-feed can be increased accordingly or the normal positions of rest can be made closer to the positions of shearing, or the R. P. M. of shaft 42 can be reduced, or all such rates so modified, particularly if also the throw of crank-pins 39, and the rate of clutch L and shaft 42 be increased to optimum. The provision of these elliptical gears is of special value here, because there are practical limits to the rate of clutch-shaft 42 so as not to cause too severe duty on clutch L in its many successive operations of locking and unlocking, one for each sheared sub-length of stock; and the provision of the elliptic gears permits all the above advantages (higher stock-feed and short arc between starting of tool H and shearing thereby, etc.) concurrently with the further advantage of a desirably low rate of clutch-shaft 42.

A specific construction of such elliptic gearing for the machine hereof is as follows, a pair of duplicate intermeshing elliptic gears being located at 17—18, Fig. 12, and a like pair of duplicate intermeshing elliptic gears at 17—18A, in lieu of 12-inch circular gears, nothing else in the machine being changed save to increase the uniform rate of operation of the feed-rolls so as to feed the stock continuously as fast as the increased rate of tools G—H at the instant of shearing, thereby increasing the productivity of the machine, in this instance by forty per cent. With shafts 42, 40, 41 as before, i. e., with centers 12 inches apart for the 12-inch circular gears, Fig. 12, the elliptic pitch-line of each of the like elliptical gears to be mounted thereon is given a longer diameter of 12 inches and a shorter diameter of about 9 13/16 inches. Also each elliptic gear is bored for its shaft at a center which is offset one inch from the middle of the longer or 12-inch diameter of the pitch-line, that is, the center of the shaft-opening is distant five inches from one end of the longer diameter and seven inches from the other end of the long diameter. And two of such elliptic gears are fixed to the driving and driven shafts so that the gears intermesh; for example, when the longer axis of the two elliptic gears are in alinement, the center of one shaft will be 5 inches from the meeting pitch-lines of the two gears, and the center of the other shaft will be distant therefrom by seven inches, etc. The increased productivity of the machine with such elliptic gearing over that with the circular gearing is as follows. Assuming a low rate, 46 R. P. M. for the shafts of these gears, the stock-feed rate for circular gears will be 75 feet p. m., but 105½ f. p. m. with the elliptic gears, i. e., an increase of about 40 per cent. Assuming a higher rate for the shafts, as 138 R. P. M., the stock-feed rate for circular gears will be 225 f. p. m., but 316½ f. p. m. with the elliptic gears, i. e., again an increase of about forty per cent. Thus, while the cost of making elliptic gears is high, yet they are well worth while in this invention.

A primary reason why the normal positions of pins 39 may be close to the middle of the quarter cycle of revolution at which shearing is done is that in that location the rate of horizontal travel of tool H is increasing rapidly no matter what may be its rate of circular travel; and such increase of horizontal rate is cumulative with the acceleration of circular rate consequent upon the tripping of clutch L. In these circumstances the provision of the elliptical gears is useful as a third cause of rapid acceleration of tool H; and this has the useful effect, not only of permitting a higher rate of stock-feed without increasing the rate of clutch L and its shaft 42, but in permitting the position of rest of tool H to be closer to its shearing position by causing it to be so rapidly accelerated that by the time it contacts with the stock it has attained the same horizontal rate as that of the stock, the ultimate useful effect being the substantial elimination of time between the starting of clutch-shaft 42 and the starting of actual shearing, thereby preventing during such time any substantial stock-slipping relation to the feed-rolls which would cause lack of uniform sheared sub-lengths.

As is shown, carrier 34 and tool H normally are at one side of the line of stock-feed, i. e., when they are in their stationary positions, Fig. 15 and for that reason it is unnecessary for the carrier to be large enough to be formed with a passage for the feeding stock; this being another reason for the advantage of simplicity of the machine hereof.

While it is preferable to provide the bronze blade-carrier 34 with trunnions 39 fixed to it, the relative motions being then between 39 and 38, yet it is permissible to have said trunnions or crank-pins 39 secured to the crank-disks 38 and journaled in suitably bushed holes formed in the blade-carrier 34. Also disks 38 may be consolidated with their respective gears 18, 18A so as to constitute crank-wheels with toothed peripheries and with laterally projecting crank-pins 39.

Shafts 40—41 which are journaled in the frame 36 are removable therefrom thru the medium of the removable bearing-caps 35—35, Figs. 3, 5-6, which caps are held in place by the cap-screws 33, Fig. 3.

The gears 17, 17, 18, 18A may be considered to be diagrammatic showings of any suitable gearing such as the elliptical gears hereinafter described.

When clutch L is tripped by the van of the stock, the clutch is locked to clutch shaft 42, Fig. 12, for one complete revolution; and thru the gearing 17—18, 18A the shafts 40—41 with their crank-disks 38—38 likewise are locked to clutch L and so turned thru a single rotation as to cause the above actuation of the blade carriers 34, F by crank-pins 39.

Shearing tools

The vertically reciprocating guillotine-like blade H, Figs. 6, 19, is of rectangular construction and is located between the fore and aft upright portions of G-carrier F, Fig. 6, with its presented cutting-edge positioned flush vertically with the left face, Fig. 6, of its own carrier 34; blade H being secured to 34 by bolt E, and the receiving-recess for flush blade H in carrier 34 is formed transversely angular, so as to position the cutting edge of blade H at a slight rake or shearing angle with the horizontal cross-section of stock Z (especially when a strip or sheet) and with the cutting-edge of the box-like die-ensemble G. That is, one end of blade H is a little higher than the other, so that the shearing action is progressive from one end to the other of blade H. The simple rectangular formation of blade H makes possible the use of all four of its long edges at different times for shearing without regrinding.

The blade G assembly, Figs. 6, 19, is of open-ended box-like formation and is retained in its carrier F by the specially formed collar-head screws 222, Fig. 6; and G is preferably constructed, Fig. 19, with top and bottom halves 223, 224; the general parting-line 225 of which is preferably at either the top or bottom (contra a mid-position) of the stock-guiding passage-way between 223—224; and said parting-line 225 being interrupted horizontally midway by an interlocking downward projection 224A, Fig. 19, formed integral with the upper box-half 224; the lower half 223 being correspondingly formed to receive and longitudinally lock 223 with 224; it being understood that such interlocking between 223—224 only extends to the central stock passage-way thru die G as indicated in Fig. 19.

The orifice to said stock passage-way between 223—224 is formed with a wide bell-mouth on the stock-entering side (left toward reel A, Figs. 6, 19) the easier to receive the original van of a coil of stock being introduced thru the machine, so that incidentally die G acts as a guide for the initial van of stock Z in a coil on the supply-reel.

Stock-discharge

Associated with the operating cycle of the flying-shear unit U is the cooperating stock discharge mechanism D3 located to the right of the shear unit U, Figs. 1, 1A, 2A; said discharge unit D3 being inter-connected with the shearing mechanism by way of the miter gears 24—25, Figs. 2, 3, 4, 6 and 7; miter-gear 24 being fixed to shaft 41 with its hub 24A preferably formed to support the gear 18A as shown in Figs. 4, 7; and miter gear 25 being fixed to the end of the long cam shaft 32, Figs. 2, 4, 6; said shaft 32 being locally supported at a point adjacent the mounting of miter-gear 25 by a detachable bearing bracket 26 which is rigidly seated on the ledge 36C of the shear-frame pedestal 36. To shaft 32 is keyed cam 27, as shown in Fig. 15A, to cause discharge of sheared sub-length of stock. This cam preferably is pluralized along shaft 32, to provide one cam for each of the plural rocking-levers 28. With the tripping of target K by the van of the parent stock Z and the subsequent power locking of shafts 40—42 with the continuously rotating fly-wheel bull-gear 51 of clutch L for a one revolution fabricating cycle, cam-shaft 32 will be rotated and cams 27 revolved via the miter-gears 24—25 thru a tuned companionate one-revolution stock-discharging cycle.

The zero position of said cam or cams 27 corresponding to the zero positions of trunnions or pins 39 at eight o'clock of Fig. 15, is shown in Fig. 15A where one of the discharging cams 27 is shown lying horizontally and in that position supporting one of the rocking-levers 28 mounted on the stock-discharging rock-shaft 29, cam 27 in that position lying ready to lift 28 and lower 96 via pivot-shaft 29; said shaft 29 normally being under a clockwise closing torsion from the helical compression springs 64, one for each of levers 28, Figs. 15A–18A, to hold them in contact with cams 27. This compression of springs 64 keeps the bottom stock-guide 96 tightly closed upwards against the bottoms of the two combination top-and-side stock-guides 98—98, Figs. 7–10, 15A, guides 96, 98, 98 forming substantially a box into which stock Z is fed; and bottom stock-guide 96 being suspended from the rock-shaft 29 by the supports 97 to which guide 96 is attached by the stud-bolts 95, Figs. 8–9.

Between the closed stock-guides 96, 98—98 there is formed a stock-guiding passage O, Figs. 7–8, 10 for the stock Z as its successive vans are continuously fed to the target-unit K, Fig. 10, for the pre-gauging of the linear dimension of the fabricated sub-length Z1 therefrom and causing tripping of clutch L and the subsequent shearing of Z—Z1 by G—H with subsequent dumping of the freshly severed sub-length Z1 by the cams 27 from the box 96, 98, 98.

The springs 64 are attached to the rock-shaft 29 via the pull-down connecting-rods 105, the pivot-pins 206 and the crank-levers 107, Figs. 7, 15A–18A; springs 64 obtaining their anchorage and actuating purchase from the shaft-like alining-rod 108 thru the medium of the spring-support member 109; the latter being formed to house the spring 64 and to guide the pull-down connecting-rods 105 assisted by the spring-retaining piston-like guide-plugs 110, which also assists the hexagonal nut 111 to regulate the tension of springs 64, Figs. 15A–18A; said spring-support members 109 being pivotally free on the support-rod 108 and thereon longitudinally positioned between the fixed shaft collars 112—112, Fig. 11.

Hence, when a van of stock Z is fed, Fig. 10, to the target-unit K, to unlatch clutch L from Fig. 22 to Fig. 23 and initiate operation of the flying-shear mechanism U and cam-shaft 32 of the stock-discharge unit D3, the cams 27, Fig. 15A, supporting the rocking-levers 28 are revolved anti-clockwise to rock the shaft 29 and so raise levers 28 against the restraining downward pull of the helical springs 64; all this for the purpose of swinging the bottom stock-guide 96 anti-clockwise away from guides 98—98 as in Figs. 16A, 17A to open the bottom of the stock-box and release the freshly severed sub-length Z1, Fig. 16, from its confinement in the guide passageway O; but when the cams 27 have been rotated past their maximum actuating position, Fig. 17A, and when sub-length Z1 has been transversely discharged from its feeding and shearing supports 96, 98—98, as shown, then the springs 64 once more are free to exert themselves to rotate shaft 29 clockwise, Fig. 18A, thus returning 96—97 to their positions of rest as shown in Figs. 15A, 18A; all of this discharging action taking place in a very short time so that the guide passage O between the stock guides 96 and 98—98 is quickly re-formed by the upward movement of 96 to receive the newly formed van of the parent stock Z, Fig. 18, and to guide it to the length-master or target unit K, Fig. 10, for repetition of the foregoing cycle of operations.

The skeleton structure of discharge unit D3, Figs. 12A–18A, together with its association and alinement with the heavier structure of the machine proper (including frame Q, 131—132 and 144 etc., Fig. 1) is maintained mainly thru the longitudinal tubular component member 81, Figs. 1–2, and its connecting flange 82 which form the means by which D3 is fixed to the structure of the machine proper; the uprights N—N1 being suitably spaced along 81, Fig. 1A and the left-hand upright N1, Fig. 1 right, nearest the shear U being further tied to the machine structure by the short tie-member 83, Fig. 1; while at the same time N1 is rigidly spaced from the companionate uprights N, Fig. 1A, by the tie-bar 108, Figs. 15A–18A, each upright N being individually drift-keyed to 108 via 113—114 as depicted in the details of Fig. 11.

While not necessary, it is preferable, as when the machine is under construction, to individually affix the uprights N—N1 to the tubular-support 81, by first adjusting said uprights N—N1 to the desired alinement with the several operating units of the machine proper on center-to-center spacings of substantially five feet apart in the exemplary machine and then running molten babbitt in between said tubular support 81 and the openings 81A, Fig. 7, in the assembled upright units N—N1. This in effect casts said uprights N—N1 solid with the tubular support 81, forming a relatively substantially rigid structure for the discharge mechanisms D3 and keeping stock-guiding passage O, formed by the stock-guides 96, 98—98, in working alinement with the path of the continuously fed stock Z.

This construction of the stock-discharging mechanism D3 allows (thru the freeing of the bearing-bracket 26, the tie-member 83 and the flange 82 as by the removal of the nuts off the flange-studs 82S, Fig. 3) the separation of the stock-discharge mechanism D3 from the frame of the machine proper so that the same may the more easily be handled for crating and shipping, etc.

In the handling of skeleton structures analogous to the above stock-discharging mechanism D3, as thru interstate rail and terminal shipment, it occasionally happens that some component casting of the structure is unavoidably cracked or broken; therefore, to minimize the replacement cost of a sub-unit such as the upright castings N—N1, the same are preferably, but not necessarily, built up of several components including the base-castings 115, the intermediate frame 116 and the top-castings 117, Fig. 7; the obvious result being that it will not be necessary to replace the whole if some component suffer damage.

The top-castings 117 of the upright units N—N1 support both the suspended combination top-and-side stock-guides 98—98 with the cap-screws 92 and the inverted channel-formed bus-bar support 143 with the cap-screws 91, Figs. 7–9. It is to be noted that the manner of support by 117 of the guides 98—98 does not interfere with the longitudinal passage of the target-unit K, Figs. 7–9, at any point of its movement along the inter-locked top surfaces of the guide members 98—98; one of the top-guides 98 being suitably graduated, thruout its length with suitable markings of feet and inches all of which register in due relation with the pre-gauging position of K actuated by the stock-van and the subsequent point of stock severance by the blades G—H of unit U.

Target K

The supporting body-member 145 of unit K, Fig. 10, is formed with hooks 145A—145A which engage with the overhanging ledges 99—99 of guides 98, so that unit K supported by said body-member 145 may be horizontally adjusted and guided by ledges 98—99; the graduations at 99A of guide 98 indicating approximately the position to which unit K is to be clamped for fabricating a sub-length Z1 of the indicated linear dimension; said clamping being effected thru the set-screw 146 threadedly mounted in the body-member 145 and contacting with the graduated surface 99A of guide 98 thru a soft-copper plug 147 Fig. 9, which prevents undue marring of said graduated surface 99A of guide 98 by set-screw 146.

The supporting body-member 145 of unit K is bifurcatedly formed at 145B to straddle and support the stop 148 which swings on pivot-pin 149, Figs. 10, 21, fixed in the said bifurcated portions 145B of the body-member 145, Fig. 10. In operation the feeding stock Z strikes the lower end KF of the target and swings it anti-clockwise to operate the switch to operate the clutch L.

To that side of stop 148 away from the supporting body-member 145 (to the right Figs. 9–10) is attached by means such as the rivets 152, Figs. 9–10, the combination trip-and-contact support member 151, Fig. 21, which is formed with a sub-extending vertical portion KF that projects centrally downwards thru the slot or channel between guides 98, 98 into the path thru which stock Z is fed left to right thru the passage O between the guides 96, 98—98, Figs. 10, 19; and to the upturned portion 151A, Figs. 9–10, is rigidly attached the insulating member 158 via the bolt-element 159 whose fillister head is set sufficiently below the surface of 158 to allow the same to be covered with some sort of plastic insulation such as sealing-wax (not shown); this provides complete isolation of the combination trip-and-contact-support member 151 from the copper contact elements 160 which are fixed to the insulating element 158 by the bolt-elements 161, Figs. 8, 10, 13; and the heads of bolts 161 are preferably also isolated from 151A, Fig. 13, by the use of plastic insulation (not shown).

As the van of stock Z is fed further to the right, it will make contact with the suspended flag-portion KF of the combination trip-and-contact support member 151 to push KF anti-clockwise out of its way and, in so doing, the far end 151A, supporting 158—161, is pivotally raised at 149 to bring the two bifurcated contact terminals of 160—160 into contact with the bus-bars 162—163, thus completing the electrical circuit thru wiring 164 to energize the coil of solenoid 85 which acts to trip clutch L, Fig. 20; all this resulting in the locking of shafts 40—42, Fig. 12, with motor P, Fig. 1, thru the constantly rotating flywheel bull-gear 51, Fig. 2, thus causing the actuation of the flying-shear unit U, Fig. 12, thru an operating cycle and resulting in the severance by blades G—H of a sub-length Z1 from off the treated advance portion of the parent stock Z; and synchronously with this shearing by G—H is the operation of the discharge mechanism D3, Figs. 16A, 17A, which removes the stock Z—Z1 out from under the target-flag KF, Fig. 21, allowing the swinging elements KF, 151—152, 158—161, Fig. 10, to return clockwise downwards by gravity on pivot 149 to break the electrical circuit formed by 160—169 in resilient contact with the "live" bus-bars 162 and the "dead" bus-bars 163, so that solenoid 85 is thereby de-energized and KF returned to the path in front of the new van of stock Z, all of which chain of operations is completed in a very short time.

Also the above switching, shearing, and discharging operations are so coordinated in the machine that after the advancing van of stock Z to be sheared has swung pendant target-member KF anti-clockwise to close the electric switch to start the movements of the clutch and shearing mechanism, the momentary continued advance of the stock-van is permitted by the resilient yielding target-members 160, Fig. 10, which may be of spring and plunger design, and the clutch-switch thus is kept closed during the very short time before shearing while a minute portion of the stock to be sheared off is fed during the time occupied by solenoid 85 in starting the clutch and during the time occupied by tools G, H in moving from rest to and thru shearing positions; the clutch-switch being kept closed after shearing only long enough for the operation by clutch L of cams 27 to depress box between 96 for discharge which may indeed be as early as the completion of shearing; altho the forward sheared length Z1 of stock may be confined, after shearing, (for continued clutch-operation), in box 96, 98, the sheared-off length then being pushed forward in the box by the new van of the parent stock Z thereby keeping the clutch-switch closed until the operation of the clutch is no longer needed, when the sheared-off length Z1 is free to be moved as by gravity to a position away from target-member KF, as below it, Fig. 17A, by the downward swinging of box-bottom 96 in turn permitted by the action of cams 27 coordinated with the shearing mechanism. In any case, after stock-discharge, member KF can swing down clockwise by gravity to its normal position pendant thru the top slot of box 96, 98 in the box, in advance of the new van of the parent stock but in the path of feed thereof and ready for next operation thereby the stock-van to start the next shearing cycle.

As shown, the movements of the shear-mechanism do not stop forthwith upon the opening of the switch by the return of the target upon stock-discharge, but such movements continue as follows. Upon open-circuiting of the switch, magnet 85 instantly raises plunger 86 to its normal position of rest by pulling down on pivoted member 100 causing the pawl-flipper 102—103 to slip beneath detent 67 in preparation for the next cycle of operation of the shear-mechanism; but at substantially the middle of the existing rotation of clutch L, and when tool H is about at 2 o'clock moving counter-clockwise in its revolution, the clutch stop-nose 56B, (dotted outline at left, Fig. 23), contacts with relatching-roll 76 moving it leftward against the tension of rightwardly pulling spring 70 for counter-clockwise swing of the connecting linkage pivoted at 80—89, so as to swing clutch stop-member 69 into a clutch-unlocking position, Fig. 22, where spring-loaded detent 67 engages with shear-like notch 185 to hold stop-member 69 in its unlocking position until clutch L has had time to complete its complete single rotation when stop-nose 56B once more impinges on 69 to unlock the clutch from drive-shaft 42, Fig. 18, thereby, cooperatively with braking mechanism W, 61, stopping the revolutions of tool H at almost 8 o'clock.

From the above the general method involved in the invention can be understood, which is accompanied by the improved accuracy of production of sub-lengths, said method including the supporting of a portion of the stock advanced by the feeding mechanism beyond the shear, at least before and during shearing, the starting of the clutch and thereby the revolving shear by means of such advance of the stock while so supported beyond the shear, the revolution of the shearing tool preferably being substantially in the plane of the direction of stock-feed, the tool preferably being started by the clutch from a tool-position of rest close to the shearing position at about 7:30 of the shear revolution (when the tool moves down to shear) and rapidly accelerated in the direction of stock-feed just prior to shearing; the operation of the clutch causing first shearing and then discharge of the sheared-off stock from its supported position controlling the operation of the clutch thereby initiating the disconnection of the clutch-members from one another so that the driven clutch-member and the shearing tools rotate idly thereafter and during the rest of their desired single revolutions, giving ample time after the shearing nears the beginning of the cycle, for the operation of the braking mechanism on the light-weight shear-crank shear-mechanism, so as to bring the same to rest at the normal position of the revolving shearing tool close to its shearing position for its next intermittent cycle.

The bus-bars 162—163 of the switch for clutch L are supported and physically protected top and sides by the inverted channel-like support member 143, Fig. 10, which is fixed to the top casting 117 of the uprights N—N1 by the cap-screws 130, Figs. 7–9.

Insulation is provided between bus-bars 162—163 and the support 143 thru the medium of a plurality of insulation blocks 165 to which the bus-bars 162—163 are fixed, as by the rivets 166, Figs. 9, 14; said rivets having their heads set below the top surface of the insulation-blocks 165 and suitably sealed with plastic insulation (not shown).

In the erection of the bus-bars 162—163 with their support 143, the bus-bars 162—163 first are attached to their several insulation blocks 165 and then the complete ensemble is lifted and fastened in place by the cross-pins 188 which are passed transversely thru both the insulation blocks 165 and the downwards extending side-flanges of the bus-bar support 143, Figs. 9–14.

The bus-bars 162—162 are connected with suitable lead-in wires 187, Figs. 10, 21, which wires are suitably armoured or otherwise insulated up to and including their entrance thru the holes 186 in the bus-bar support 143, Figs. 2A, 10; which point of entrance for wires 187 may be at any convenient point along the top of support 143, but preferably adjacent one of the mid-positioned uprights N—N1 to which upright said lead-in wires 187 may be the more conveniently secured.

From a study of the wiring portion of the diagram of Fig. 21 it can be ascertained that the two outside bus-bars 162—162 are normally "alive" and that the two central bus-bars 163 are correspondingly "dead" until at those brief instances when the van of stock Z actuates the contact members 160 into resilient contact with the bus-bars 162—163, thus electrically bridging these members in series to complete the electrical circuit thru wiring 164 to the solenoid 85 to cause functioning of clutch L and shearing of Z—Z1 by G—H with a synchronous discharge of the sheared product Z1 that finally completes the cycle of operations via the breaking of the electrical bridging contact made between 162—163 by 160.

Manual trip

For the purpose of providing the operator with a control by which he may manually cause at any time an abortive tripping of clutch L, Fig. 20, there is provided the auxiliary wiring 164A, Fig. 21, thru which the solenoid 85 may be energized, as by the operator's manipulation of the push-button switch Y, this at any intermediate moment when the solenoid 85 is not operated in the usual way as when the van of stock Z contacts with KF to actuate the unit K, etc.

This equipment, including Y, 164A, enables the operator to abortively control the instant of operation of the shearing mechanism U so that when the original van of a coil of stock Z is initially passed thru the several stock-treating units, including D, D1, D2, it is possible for him to have the blades G—H of unit U abortively actuated thru Y, 85 and L to cut off a foot more or less of the advance or crop-end of the stock Z; this so that with the subsequent automatic tripping of K by the thus freshly formed van of stock Z, the first pre-gauged full-sized sub-length Z1 will be of proper quality thruout its length and not have a misformed end as would be the case if the first twelve or fifteen inches were not cropped off by C—H as just described thru the operator's abortive tripping of clutch L by the manually controlled switch Y.

Tripping magnet

For clearness of illustration the solenoid 85 is shown in Fig. 3 as being supported by the strap-like forgings 177, altho in practice it is preferred to substitute cowl-like castings that will both support the solenoid 85 and at the same time provide a strong protection against physical injury such as might occur if a bundle of sheared sub-lengths Z1 or other material were accidentally bumped into the solenoid while being moved over or about the machine as by an overhead traveling-crane, etc.

The solenoid 85 is preferably of a push-pull type that will preferably, but not necessarily, operate with the same electric current as motor P which in the exemplary machine is preferably adapted for direct current of 230 volts; said solenoid 85 having a total downward operating plunger-stroke of two inches of which only about one-half inch is effectively used for the tripping of clutch L. In Fig. 3, the magnet-armature 86 is shown in the mid-position of its downward operating stroke, Fig. 20.

Normally the solenoid magnet 85 is not energized, its plunger 86 is held up by spring 93, Fig. 20, and, Fig. 12, shear-shaft 42 is inoperative by clutch L which in Fig. 22 is shown in latched position. When the magnet is energized, its plunger 86 is electromagnetically pulled down by the coil, to establish, Fig. 23, the temporary unlatched relations of clutch L and the shear U.

When the solenoid 85 is de-energized, as by the discharging of a sub-length Z1 out from under the trip KF of target K (which reacts by gravity so that the circuit between 162—163 is broken), then the solenoid-plunger 86, Fig. 20, is returned upwards to its extreme elevated position of rest thru 100, 90A, by the helical tension-spring 93 which is anchored to the inside face of the tripping mechanism support-bracket Q3 by the anchorage stud 94, Figs. 4, 20.

When the plunger 86 of solenoid 85 is returned as above by the spring 93 aided by the counter-balancing effect of 100, 90A, the disengaging point 103 of flipper 102 is cammed back against the energy of spring 104 to allow passage and resetting of 103 beneath the end of detent 67; this being preparatory to the next upward flipping action of 103 by the solenoid 85 to again unlatch 69 to the disengaging energy of spring 70 which spring pulls stop 69 free from the stop-nose 56B of clutch L, Fig. 23, allowing the torsion spring 60 thereof to rotate the roll-basket 56 and the locking-rolls 57 (not shown) into engagement to lock shafts 40—42 with the continuously rotating flywheel bull-gear 51 for a one revolution cycle.

The locking of shafts 40—42 with the continuously rotating flywheel bull-gear 51 is limited to a single rotative cycle due to the fact that when the solenoid 85 (thru 90A, 100, 102) flips detent 67 out of engagement with the locking-notch 185 of the clutch-stop 69, spring 70 subsequently pulls 69 out from under the stop-nose 56B of clutch L and incidentally rocks the relatching arm 77 with its roll 76 toward clutch L thru the link 78 to bring roll 76 into the circuitous path of the roll-basket's stop-nose 56B; which, when 56B arrives in the proper point of its rotation, positively forces roll 76 with its supporting arm 77 clockwise to right in Fig. 4 with the result that thru the relatching link 78 this rightward clockwise swinging motion is transferred to the stop 69 to swing 69 again into an engaging position in the path of 56B where 69 is automatically relatched by the engagement of detent 67 with the notch 185, Figs. 22-23; and in this latched position stop 69 Fig. 22, awaits the circuitous return of clutch L's stop nose 56B to unlock clutch L from driving shafts 40—42, as and when 56B impinges on the top of stop 69. The hammer-like force of this impingement of 56B on 69 to unlock shafts 40—42 from clutch L is transferred downward thru that fitted surface 69A which 69 makes with bracket 72 to the machine structure Q—Q2 and thus to the foundations of the machine; therefore stud 80 acts primarily only to centralize and otherwise guide stop 69 in its functions of controlling the cycles of clutch L's operative periods for causing the actuation of the reciprocatory fabricating mechanism U to sever a sub-length Z1 from the advance treated portion of the parent stock Z.

Brake W

In the stopping of clutch L as at the end of its operative one-revolution cycles the kinetic energy of the moving parts of unit U, Figs. 12, 15, is mostly overcome when stopping by the automatic brake mechanism W, left Fig. 3; altho friction of the moving parts and other factors, such as the tightening of the torsion spring 60 of clutch L, assist in no small way to stop the various elements cyclically moved by clutch L; said brake W being actuated to automatically seize and release the brake drum 61, Figs. 1, 2, 3, 5, 12, by the cam X which is adjustably fixed to the brake-drum 61 by bolt-members 215.

The cam X is preferably designed to actuate brake W for a total engagement arc of substantially thirty degrees of which the first twenty-five degrees of engagement with roll 212, etc., causes uniform zero-stopping of shafts 40—42, etc., Fig. 15.

Following this stoppage the engaged elements of the brake mechanism W remain in engagement until the next fabricating cycle when thru clutch L the energy of the continuously rotating flywheel bull-gear 51 and motor P is again locked to the shafts 40—42 and brake-drum 61, etc., Figs. 12, 15, overcoming the temporary retarding effect of the frictionally lined encircling metallic brake-band 62 during the small remaining number of degrees of cam X's engagement with roll 212, or specifically until the brake-lever 199, supporting the cam-roll 212, is again freed from engagement with cam X; all this at the beginning of the succeeding shearing cycle, Fig. 16, at which time the releasing spring 198, Fig. 5, (acting thru the adjustably positioned checknuts 218, the brake adjustment members 195—195A and the terminal casting 193), supported by member 194, subsequently causes the encircling brake-band 62 to relax its frictional grip on brake-drum 61, Fig. 12, during the remaining greater part of clutch L's cycle or until cam X is once more rotated into contact with the roll 212 to actuate brake-lever 199 and so raise 196, 195 and 193 for tightening the encircling brake-band 62 with its frictional lining 15 about the perimeter of the brake-drum 61, Fig. 5; said brake mechanism W, including the fixed terminal casting 192 to which the encircling brake-band is fixed, all being anchored to the stud 63, Fig. 5; but the brake-lever 199 having its own operating fulcrum on the stud 213 which is fixed to the bracket 211, Fig. 5; and said bracket 211 being attached to the side of the table-support 144, Fig. 5.

*Stock dimensions and rates*

The exemplary machine of Figs. 1–23 is designed to treat and shear continuously fed "flat wire" or very narrow strip stock into sub-lengths varying from three to twenty feet long over a cross-section range in the order of three thirty-seconds inch thick by two and one-quarter inches wide. The rate of longitudinal stock-feed in this particular machine may be from 75 feet to 225 feet per minute, the shorter the sub-lengths the lower the rates, and the rate being varied by varying the rate of motor P.

The stock, which may be hundreds of feet long, is fed continuously in one direction from reel A to and thru a shearing unit U as disclosed to a sub-length pre-gauging electrical tripping device K controlling electromagnet solenoid 85 to cause shear-shafts 40—42 to be locked to the common driver motor P for a one-revolution stock-shearing cycle, Figs. 15–18, which produces sub-lengths Z1 of uniform linear dimension according to the adjusted position of the stock-target K in relation with the shearing positions of the blades G—H.

*Modification*

The modified form in vertical section in Fig. 24 is especially adapted for fabricating wide sheet steel stock of the order of 24 inches width more or less and of thicknesses according to the proportioning of the machine by the designer for strength, usually such as sheets one-quarter inch thick, more or less.

Long, wide sheet stock Z is here fed left to right as in Figs. 1–23, by a group of rolls C1—C—C1 in unit D, the stock passing to the shearing-unit U1 over the horizontally reciprocating blade G in carrier F, and under the horizontally and vertically reciprocating (revolving) blade H in carrier 34; H-carrier 34 receiving harmonic motion from two double sets of crank-pins 39—39 of which only one set of the two sets is shown in the sectional elevation of Fig. 24, and the H-carrier actuating the G-carrier via plural vertical members 34G (only one shown).

Very long stock sheet Z, wider than in Figs. 1–23, here is fed rightward by roll-stand D, etc., to the modified shearing mechanism U1, stock Z passing between blades G, H which may be constructed and arranged as before, Fig. 19. Also, as in Fig. 12 adjacent Fig. 24, 42 in Fig. 24 is the shaft for clutch L and may be provided with driving gear 51, Fig. 12, brake-drum 61 and gear 17 for operating blades G, H. The apparatus between gear 17 and blades G, H in Fig. 24 differs from that in Fig. 12 in the following respects.

G-carrier F here is of especially light construction. As in Fig. 6, it may reciprocate on horizontal ways 191. This carrier F has no more of a structure than is sufficient (1) to carry its blade G, (2) to engage such horizontal ways and (3) to receive at least two and preferably more vertical rods as 34G somewhat analogous to the two integral uprights F, F of carrier F in Figs. 15 and 12; but here 34G are separate light members connected with both carriers F and 34, so that as carrier 34 is revolved by crank-pins 39 it reciprocates G carrier F horizontally. Thus guide-rods 34G are lighter substitutes for parts F, F, Figs. 6, 15, these rods 34G reciprocating with carrier F and extending thru H-carrier 34 as distinguished from Figs. 6, 15 where H-carrier 34 operates between F, F. This lighter structure of carrier F in Fig. 24 is important because it is the high-speed reciprocating portion of the shear system as distinguished from the other parts which are rotary. And here in Fig. 24 the rod uprights 34G linking carriers F, 34, need not lie fore and aft of one another in the line of stock-feed, as do F, F in Figs. 6, 15, but may lie in line with one another in a direction transversely of the line of stock-feed, at least one rod 34G lying transversely to each side of blade H. Thus as H-carrier 34 is revolved by pins 39, it slides up and down rods 34G, and via the latter, secured also to the G-carrier F, the carrier 34 moves the latter horizontally. This H-carrier 34 is supported on and rotated by the crank-pins 39. Preferably there are four of these pins (having either their loose or their tight connections with carrier 34), in two pairs, one pair at each of the ends of 34 in Fig. 24. Carrier 34 may be bridge-shaped as shown, the pins 39 being located at its ends and blade H being secured to a central pendant portion of 34. Since tool H is shown as located above the work-line, crank-pins 39 are revolved anti-clockwise, see two upper arrows, being so actuated by means of a pair of short alined shafts 40 for one pair of crank-pins 39, and another pair of like shafts 41 for the other and parallel with one another, instead of one pair 40, 41 for two pins 39 as in Fig. 12, all these four shafts in Fig. 24 being rotated anti-clockwise (see arrows) by gear 17 on clutch-shaft 42 rotated clock-wise (see arrow) intermittently, upon starting, as in Fig. 23, by a suitable clutch as L. Any suitable means may be employed on shafts 40, 41 to support crank-pins 39, such as the crank-arms, plates or wheels 38 of Fig. 12; or the pins 39 may be carried directly by gears 18 acting as crank-wheels, each crank-wheel or gear being duplicated on respective shafts 40, 41 so that crank-pins 39 extend from one of such duplicated gears or crank-wheels to the other, any of said supports for the crank-pins 39 being referred to thereinafter as "crank-arms". Preferably, when there are four crank-pins 39, as above (each of the two at each end of carrier 34), each pin 39 is provided, as above, with its own short shaft 40 (or 41 at the other end of carrier 34), so that there will be two short shafts 40 in line with one another, at one end of bridge-carrier 34, and two short shafts 41 in line with one another at the other end of 34.

In Fig. 24 is shown the preferred locations of crank-pins 39 in their positions of rest, i. e., at about 8 o'clock of their circles of revolution, with blade H ready to shear almost instantly upon clutch-starting, i. e., as soon as the blade can be speeded up by the fly-wheel, altho the zero position of the blade should not be so close to the shearing position as to permit possibility of stock-blocking by the blade. In Fig. 24, altho the construction is light, yet the shear-actuating carrier 34 is arranged to have power applied to it both fore and aft of blades G and H in the direction of feed of the stock and of horizontal reciprocation of G-carrier F by means of the revolution of carrier 34; this being in contrast to Fig. 12 where the power from clutch shafts 42 is applied only forward of the blades in the direction of the discharging and clutch controlling means. In Fig. 24 the two carriers 34, F and their connections 34G and crank-pins 39 provide a very simple, light and effective construction.

In general the operation is similar to that of Figs. 1–23, the shearing preferably starting at 7:35, centering at 7:30 and being completed at 7:25, the shear-parts having harmonic motions, and shearing promptly following the start from about 8 o'clock, the latter beginning with the tripping of the clutch and rapidly accelerated by the fly-wheel 51, and the clutch-tripping promptly following the contact of the stock-van with the target; the tool H after shearing, Fig. 17, running away from the new stock-van, and then, Fig. 18, up out of the path of the stock; and the crank-pins 39, carrier 34 and carrier F being returned to and braked, together with shafts 40—42, in their normal positions of rest, Fig. 24.

This modification of Fig. 24 is suggestive as to the various possible modifications of the shearing mechanism of the invention.

The expression "crank-disk" or "crank-wheel" or "crank-pin" when used in the claims imply the widest range of equivalents.

Altho parts F, F, Fig. 15 between which carrier 34 slides are formed on integral portions of G-carrier F, yet they are not needed to support tool G which is the prime function of carrier F, and parts F, F actually constitute means connecting carriers 34 and F causing the revolution of carrier 34 to reciprocate carrier F, said parts F, F being broadly the equivalent of the members 34 G of Fig. 24.

It is to be observed that preferably, as shown, the crank-pin 39, Fig. 12, and its actuating mechanism such as 38, 40, 18, are located laterally of stock Z and carrier 34, and pin 39 preferably is connected to the end of carrier 34, all as distinguished from actuating mechanism located above or below carrier 34, or both, and separated from stock Z by carrier 34.

While the invention is shown in its various aspects as applied to the shearing of narrower or wider long steel strips, yet the same may be embodied in machines for shearing steel rod stock into sub-lengths; and various features of the invention may be applied to machines for handling long rods or strips or sheets wherein the fabrication of the stock is of some other nature than shearing, such as stamping, etc., etc.

Following the completion of stock-shearing by blades G—H at or near 7:25 o'clock of the circle of movement of carrier 34, the latter and its blade H continue thru their harmonic anti-clockwise movement towards a six o'clock position, but at a faster rate in the horizontal direction thereby advancing blades G—H at a faster rate than the uniform constant horizontal feed of stock Z by the rolls C1—C—C1 of unit D. Hence, as 34 and H sweep continuously further anti-clockwise with a rate of harmonic movement which decreases as they move from six o'clock toward three o'clock, there is no resulting interference by blade H with the continuous rightward feed of the van of stock Z just created thru the shearing by G—H of a sub-length Z1 from off the treated advance portion of the parent stock Z.

Among the advantages of the novel shearing mechanism, Figs. 12, 24, are the following, additional to the arrangements controlling the shear-positions of rest and shearing, and in addition to the general advantage of a tool H of the revolving type as distinguished from the reciprocating type. The following advantages are those pertaining to the H-carrier 34 revolved parallel with the line of stock-feed by means of crank-pins 39, Figs. 12, 24 or their equivalents, the pins 39 being connected to a portion or portions of revolving carrier 34 in such way, Fig. 12 or 24, etc., as to cause the revolution of the pins to revolve carrier 34 in a circle of which the plane is generally parallel to the line of stock-feed, instead of transverse thereto. The circles of revolution of the pins also generally parallel the line of stock-feed, the pins themselves extending in a direction transverse of the stock-line. This arrangement permits the utmost simplicity of structure for carriers 34 and F and frees them, especially 34, of all structure in the path of the stock, (save only necessarily tool H itself for shearing), because the only means needed to revolve H-carrier 34 is the pins 39 and they can be and are connected to carrier 34 in such way as to permit all actuating means to be located relatively remote from the stock and both tool-carriers 34 and F. That is, carrier 34, which is the actuator for tool H is also the actuator for carrier F, itself needs possess no structure save that required to securely hold its tool H and to reciprocate F, because 34 itself is actuated exclusively by the crank-pins or their equivalent which themselves in their simplest form are nothing but short shaft or shafts located outside the local shearing organism 34—H and F—G, said pins 39 being connected to 34 in a simple manner either loosely or tightly but preferably tight with journals at the other ends of 39. In fact, pins 39 and carrier 34 can be fabricated integrally, either by unitary casting or by the extension thru a hole thru 34, of a single member 39 secured in the hole in 34 by any desired heat treatment and extending beyond both sides of 34. Preferably there are at least two pins 39, Fig. 12, one at each side of carrier 34, for symmetrical mechanical efficiency; the pins 39 and carrier 34 in this instance being located forward in advance of the vertical shearing line of H, Fig. 15. But for additional strength and potential power application, Fig. 24, for heavier stock, the carrier 34 may extend rearwardly as well as forwardly of the tools H, G, in the line of stock-feed, so that the rear end of 34 can receive another pair of transverse crank-pins 39. Altho this more powerful shear, with more symmetrical arrangement of pins 39 for both supporting and operating 34, involves increase of structure of revolvable carrier 34, yet it correspondingly decreases structure of reciprocable carrier F by eliminating all the top structure F1, F1, Fig. 15 save that needed to support tool G. In many forms of the invention the characteristics of extreme simplicity and effectiveness are present. The means by which revolving carrier 34 causes reciprocation of carrier F may be varied widely; and a wide variety of means may be used to cause revolution of crank-pins 39 and their equivalents, the entire organization in any case being simple and effective. An important advantage of the revolution of carrier 34 parallel with the stock-movement is that there are no parts of the carrier, Figs. 15–18, save that in vertical line with tool H, whichever cross the path of the stock, the result being not only simplicity of structure but assurance of safe operation without injury to machine or stock provided only that tool H itself, Fig. 18, is kept out of the stock-path save only during shearing, i.e., when the rate of stock Z and tool H, Figs. 15–16, is substantially the same. An important aspect of the simplicity and consequent low cost is that no means is needed for reciprocation of carrier F by the revolution of carrier 34, outside of the linkage of F and 34 with one another; for the revolution of the crank-pins 39 causes horizontal movements of carrier F in both directions, thereby dispensing with need of cams or the like for moving F forward and compressing a spring for later return of F in a case where the revolution of tool H is transversely of the line of stock-feed. Persons skilled in the art will understand that where as here, Fig. 12, the H-carrier 34 extends transversely beyond carrier F, the equivalents of crank-pins 39 may be any suitable means for revolving carrier 34 in parallel with the line of stock-feed. Since pins 39 and the like not only revolve carrier 34 but also adequately support it, there is no need of any support for it other than such revolving means.

I claim:

1. In a machine for shearing long relatively narrow stock, the combination with continuously rotated rolls feeding such stock horizontally lengthwise, of two shearing tools and carriers therefor, one of said tools being reciprocable in line with the stock-feed and the other tool being revolvable anti-clockwise about a center above said stock-line and in a plane including said line, and downwardly crossing said line for shearing, said center of revolution having a location relative to the stock-line which causes shearing by said tools at about seven-thirty of the anti-clockwise revolution of the revolvable tool and said revolution having a radius short relative to the length of sheared stock sub-lengths; crank-pin mechanism also located above the line of stock-feed and revolvable about said center of revolution of said revolvable tool-carrier and connected directly to the latter for revolution thereof; said crank-pin mechanism being normally stationary in a position holding said revolvable shearing-tool in a position of rest above its said shearing positions at about seven-thirty and in the path of downward movement of said revolvable tool toward the stock; guide-means movable horizontally with said reciprocable tool and in movable engagement with the revolvable tool causing operation of the reciprocable tool by the revolution of the revolvable tool; a clutch of which the driven member is connected with said normally stationary crank-pin mechanism for intermittent operation thereof; an adjustable target operated by the feeding stock and controlling the operation of said clutch causing starting of both the revolution of said revolvable carrier downwardly toward the feeding stock and of the horizontal movement of the reciprocable carrier forwardly with the feeding-stock by means of said revolution; driving connections respectively for said feed rolls and the driving member of said clutch, said driving connections being coordinated for substantially like rates of horizontal movement of both the stock and the tool-carriers at their shearing positions at about seven-thirty of the anti-clockwise revolution of the revolvable tool-carrier; and a fly-wheel continuously rotated with the driving member of the clutch and rapidly accelerating the rate of revolution of said revolvable tool-carrier during the short arc of its movement after the start of revolution of the crank-pin mechanism by the clutch and the commencement of shearing by the cooperating shearing tools.

2. In a machine for shearing long relatively narrow stock, the combination with continuously operating mechanism feeding such stock lengthwise, of cooperating shearing tools and carriers therefor, one tool reciprocable in line with the stock feed and the other normally stationary above said line and revolvable anti-clockwise in a plane including said line and crossing the same for shearing at about seven-thirty, said revolvable carrier and reciprocable carrier having cooperative relations causing operation of the latter by the former; crank-pins connected to opposite ends of the revolvable carrier and extending horizontally and transversely of the stock on opposite sides thereof; shear-actuating mechanism normally holding the crank-pins and revolvable carrier and tool in positions of rest in the path of downward movement of said pins, carrier and tool toward the stock, but above their positions of shearing at about seven-thirty, said actuating mechanism intermittently imparting to the crank-pins, carrier and tool, single substantially complete revolutions of which the greater portions take place after the completion of shearing; and means operated by the feeding movement of the stock and determining the times of operation of said crank-pin actuating mechanism.

3. In a machine for shearing long relatively narrow stock, the combination with continuously operated mechanism feeding such stock horizontally lengthwise, of cooperating shearing tools operatively alongside one another during shearing action; carriers for said tools and reciprocable along the line of stock-feed and one revolvable anti-clockwise, the tool on the revolvable carrier being revolved thereby about a center above said stock-line but in a plane including said stock-line; two horizontal actuating shafts both above said stock-line and respectively on opposite sides thereof and at opposite ends of the revolvable carrier, and extending transversely of said stock-line; crank-pins connected between the revolvable carrier and said shafts for effecting said revolution of the carrier; said shafts above the stock-line having a distance therefrom causing shearing engagement of the revolvable tool with the stock at about seven-thirty of the anti-clockwise revolution of the carrier; the revolvable carrier and its tool having locations circumferentially relative to said shafts causing the greater proportion of each of their intermittent revolutions to take place after the completion of the shearing operation; clutching and braking mechanism imparting motions to said shafts limited to single substantially complete rotations thereof; and clutch-starting means including a target control operated by the movement of the stock caused by said feeding mechanism.

4. In a machine for shearing long relatively narrow stock into sub-lengths, the combination with continuously operated mechanism feeding such stock lengthwise in a horizontal direction, of normally stationary shearing mechanism including shearing tools operatively alongside one another during shearing action; carriers for said tools and both reciprocable along the line of stock-feed and one revolvable anticlockwise, the tool on the revolvable carrier being revolved thereby about a center above said stock-line but in a plane including said stock-line and over a distance short relative to the sheared sub-lengths; carrier-guiding means connected to the reciprocable carrier and in sliding engagement with the revolvable carrier causing reciprocation of the former by the revolution of latter; actuating shafts on opposite sides of the stock-line and at opposite sides of the carriers; crank connections between the sides of the revolvable carrier and said shafts and intermittently revolving said carrier; said shafts having locations relative to said stock-line causing shearing engagement of the revolvable carrier with the stock at about seven-thirty of the anti-clockwise revolution of the carrier; the revolvable carrier and its tool having locations circumferentially relative to said shafts causing the greater proportion of each of their intermittent revolutions to take place after the completion of the shearing operation; clutching and braking means intermittently imparting motions to said shafts limited to single substantially complete rotations thereof; and clutch-starting means including a target control operated by the movement of the stock caused by said feeding means.

5. In a machine for shearing long relatively narrow stock, the combination with continuously operated mechanism feeding such stock horizontally lengthwise, of shearing mechanism intermittently operated during the operation of said feeding mechanism and in coordinated relation therewith; a long horizontal box located beyond the shearing mechanism and in line with the direction of stock-feed and receiving and supporting the moving stock-van at least prior to and during shearing, said box being formed with a top slot and a laterally swinging bottom; a target-support slidingly secured above said slot for horizontal adjustment longitudinally of the box for determination of length of sheared sub-lengths of stock; a target extending down thru said slot in the path of the stock thru the box and pivotally supported by the target-support for upward swinging by the van of the stock; an electrically controlled clutch; electrical switching means therefor including yielding means and closed by the contact of the moving stock-van with the swinging target as long as the box-bottom is closed and at least during shearing; mechanism coordinated with the shearing mechanism and swinging down said box-bottom discharging the sheared-off sub-length by gravity from its position of contact with said target; means normally holding said target in its lower position in the box extending down thru the box-slot; and means normally holding said box-bottom in its upper closing position holding the stock up in position for its lifting and holding up the normally hanging swinging target.

6. In a machine for shearing long relatively narrow stock, the combination with continuously operated mechanism feeding such stock lengthwise, of shearing mechanism; a long box beyond the shearing mechanism and receiving and temporarily retaining the longitudinally moving stock; a clutch intermittently operating said shearing mechanism during the operation of said feeding mechanism and in coordinated time relation with the latter; said box being formed with a longitudinal slot and a longitudinal portion laterally movable for stock discharge; and a target controlling the operation of the clutch and normally extending thru said box-slot into the interior of the box in the path of the longitudinally moving stock; said target being movable inside the box by the longitudinally moving stock for initiating operation of the clutch; and mechanism coordinated in time-relation with said shearing mechanism and moving said laterally movable box-member for discharge of the stock from its position holding said target in operative relation maintaining operation of the shearing mechanism.

7. In a machine for shearing long relatively narrow stock, the combination with continuously operating mechanism feeding such stock lengthwise, of a normally stationary shearing-tool-carrier and its tool reciprocable in line with the stock-feed, a cooperating shearing tool carrier and its tool revolvable in a plane paralleling said feed-line, said revolvable carrier normally lying stationary in a position at substantially only one side of the stock; actuating mechanism intermittently, during the operation of said feeding mechanism, imparting single revolutions to said revolvable carrier; and means causing operation of the reciprocable carrier by the operation of the revolvable carrier; said actuating mechanism being in substantial duplicate on opposite ends of the carrier and connected to said ends.

8. In a machine for shearing long relatively narrow stock, the combination with continuously operated mechanism feeding such stock longitudinally, of a shearing-tool-carrier normally stationary in a position at substantially exclusively one side of the line of stock-feed but revolvable in a plane paralleling said line; crank-pins connected to opposite ends of said tool-carrier; shear-shafts revolving said crank-pins and extending transversely of the stock-line but on opposite sides thereof; a clutch-shaft geared to said shear-shafts; and a clutch intermittently operating said clutch-shaft during the operation of said feeding mechanism.

9. In a machine for shearing long relatively narrow stock, the combination with mechanism feeding such stock lengthwise, of a shearing-tool-carrier normally stationary in a position at one side of the line of stock-feed but revolvable in a plane paralleling said line; crank-pins connected to opposite ends of said carrier and revolving it in said plane; and mechanism revolving said crank-pins also in parallel planes.

10. In a machine for shearing long relatively narrow stock, the combination with continuously operated mechanism feeding such stock lengthwise, of a tool-carrier and shearing tool thereon normally stationary on one side of the line of stock-feed, and crank-pins located on the same side of said line as said tool but at opposite ends of said carrier and connected to said carrier and revolving it and its tool across said line of stock-feed.

11. In a machine for shearing long relatively narrow stock, the combination with continuously operated mechanism feeding such stock lengthwise, of a tool-carrier and a shearing tool thereon normally stationary on one side of the line of stock-feed, and crank-pins located on the same side of said stock-line as said tool and connected to opposite ends of said carrier and intermittently imparting single substantially complete revolutions to the tool across the stock-line for shearing, said crank-pins being normally stationary in positions holding said shearing tool in its position of rest in its path in a direction of its initial intermittent movements toward the stock, which position of rest is close to the positions of the tool during shearing.

12. In a machine for shearing long relatively narrow stock, the combination with continuously-operated mechanism feeding such stock lengthwise horizontally, of a revolvable tool-carrier normally stationary in a position substantially above the horizontal line of stock-feed and extending transversely of said stock-line for revolution in a plane paralleling said stock-line; a shearing-tool on said carrier and revolvable thereby across said stock-line in a plane paralleling said stock-line; substantially duplicated mechanisms both also located above said stock-line and connected to the transverse ends of the revolvable carrier; and mechanism revolving said duplicate mechanisms thereby revolving said carrier and tool.

13. In a machine for shearing long relatively narrow stock, the combination with continuously operated mechanism feeding such stock lengthwise, of a shearing-tool-carrier revolvable in a plane paralleling the line of stock-feed and normally stationary at one side only of the stock; carrier-actuating mechanism located adjacent opposite ends of said carrier and connected thereto to revolve the same; mechanism intermittently operating said actuating mechanism during the operation of said feeding mechanism; and controlling means for said operating mechanism and itself controlled by the feeding movement of the stock.

14. In a machine for shearing long relatively narrow stock into relatively short sub-lengths, the combination with continuously-operated stock-feeding rolls arranged on opposite sides of the stock-path for feeding of the long stock lengthwise toward the two shearing tools, of one tool spaced from the feed-rolls and reciprocable along the stock-path and located in position supporting during shearing the successive van ends of the stock being fed by said rolls between the tools, while successive portions of the length of the long stock moving to said tool are supported at a distant point by means of said feed-rolls; a carrier for said stock-supporting tool and supported for reciprocation along the stock-path and carrying said tool in its said supporting relation to the continuously moving stock; a second shearing tool located for shearing cooperation with the first and normally located on the other side of the stock-path from the first tool and separated therefrom; at least one pair of crank-pins located both in the same plane parallel to the path of reciprocation of said carrier and spaced apart from one another in positions parallel to one another along the stock-path and extending across the stock-path and located substantially beyond said tools respectively in opposite directions therefrom along the stock-path; a carrier for said second tool and extending along the stock-path to said spaced-apart crank-pins, said second carrier being supported by the crank-pins at portions of the second carrier substantially beyond the two tools respectively in opposite directions therefrom along the stock-path; said second tool being mounted on said second carrier in position intermediate said portions of the second carrier which are supported by the crank-pins, for movement of the second tool across the stock-path to and alongside the first tool; at least one member connecting said two carriers and extending from one side of the stock-path to the other and located intermediate the ends of the second carrier along the stock-path and intermediate the crank-pins and extending at right angles to the stock-path and to the crank-pins and to the path of reciprocation of the first carrier and its stock-supporting tool; the second carrier being connected to a portion of said carrier-connecting member at one side of the stock-path for broadside bodily reciprocation of the carrier-connecting member by said second carrier and by the crank-pins, but said second carrier being free for movements of it by the crank-pins toward and from the first carrier; the first carrier being connected to a portion of said carrier-connecting member at the other side of the stock-path for reciprocation of the first carrier along the stock-path by means of the reciprocation along the stock-path of the second carrier and carrier-connecting member by the crank-pins; said carrier-connections to said carrier-connecting member preserving the shearing relations of the two tools to one another during the movements of the second tool and its carrier by the crank-pins; means continuously rotating said feed-rolls causing continuous movement of the successive van ends of the long stock between and beyond the two normally separated tools and sufficiently far beyond them to produce sheared-sub-lengths of the desired length; and operating means co-ordinated with the rate of said continuous roll-rotating means and revolving the crank-pins simultaneously in the same direction in circles of the same diameter substantially shorter than the sheared sub-lengths and of the same diameter for different lengths of sub-lengths.

15. In a machine for shearing long relatively narrow strips or sheets of steel, the combination with continuously operated mechanism feeding such stock lengthwise, of a box-like shearing tool intermittently reciprocable in the line of stock-feed and formed with a passage for the feeding stock, said tool holding the stock in shearing position during shearing, a shear-blade raked transversely of the strip stock; cooperating carriers for said tools; mechanism intermittently revolving the blade-carrier in a plane paralleling the line of stock-feed, and mechanism including a target-trip operated by the van of the feeding stock, a clutch started thereby, a clutch-shaft, a crank-pin directly connected to said revolvable blade-carrier and revolving it, and a shear-shaft driven by the clutch-shaft and revolving said crank-pin; and means providing sliding connection between said carriers whereby the revolution of the blade-carrier by said crank-pin causes reciprocation of the cooperating tool-carrier in the line of stock-feed.

16. In a machine for shearing long relatively narrow stock, the combination with continuously operated mechanism feeding such stock lengthwise, of a revolvable shearing-tool-carrier normally stationary at one side of the stock, a cooperating tool-carrier reciprocable over relatively short distances in the line of stock-feed by revolution of the first carrier; two rotatable actuating mechanisms for said revolvable carrier both located on the same side of the stock as the revolvable carrier but respectively located on opposite sides of the carriers and connected to the revolvable carrier to operate both the carriers; and means independent of said revolvable carrier and simultaneously rotating both said actuating mechanisms intermittently during the operation of said feeding mechanism.

17. The combination, in a stock-fabricating machine equipped with at least one speed reduction unit and a flying-shear mechanism, of a machine structure supported by a more or less rectangular pedestal-plate of greater length than breadth supporting with at least two upright spacer members a superimposed table-member to which is fixed a plurality of stock treating units including the flying-shear; the space between said pedestal-plate and table-member substantially housing the speed reduction units and a common source of operating power.

18. A fabricating machine for stock of greater length than breadth having a plurality of stock treating units and a flying-shear mechanism which are all mounted on a common table-like support; all of which are synchronously driven from a common motor thru at least two power distributing speed reduction units positioned subjacent said table support and mounted on a pedestal floor-plate; said plurality of speed reduction units being arranged with their high speed driving shafts in operating alignment and parallel to the line of the feed of the stock.

19. The structure of a fabricating machine for stock of greater length than breadth having a plurality of stock treating units which are all mounted on a table-support; said table-support being positioned above and spaced apart from the supporting floor-plate by at least two end-support members; both said table and floor-plate being provided with a rectangular opening extending lengthwise the general structure of the fabricating machine, in and thru which openings the fixed and adjustable transmissions extend to drive at least one of the stock treating units substantially as shown in the drawings.

20. In a machine for shearing long relatively narrow stock, the combination with continuously operated mechanism feeding such stock lengthwise, of cooperating shearing tools simultaneously movable first in the direction of stock-feed and then back to normal positions of rest, one of said tools being also simultaneously movable first toward and across the line of stock-feed for shearing and then back out of the line of stock feeding to its said normal position of rest; mechanism intermittently actuating said shearing tools thru said cycles from their said normal positions of rest and back thereto during the operation of said feeding mechanism; mechanism supporting the van of the stock fed beyond the shearing tools toward its shearing position, said mechanism supporting said stock-van at least while on its way to its shearing position and during shearing and including a hollow construction of one of said shearing tools and a long box alined therewith, means starting said shear-actuating mechanism and controlled by the stock-van during its feeding movement beyond the shearing tools thru said box and toward its supported shearing position therein, said starting means continuing under control of the stock-van on the supporting means at least until said van has been sheared off from the parent stock causing desired continuation of operation of the shear-actuating mechanism; said box and hollow tool holding the stock on all sides in shearing position during shearing but including a laterally tiltable bottom; and mechanism operated by said shear-actuating mechanism and tilting said box-bottom discharging the sheared-off stock-van from its position on the supporting means wherein it continues control of said starting means, thereby discontinuing operation of said starting mechanism itself.

21. In a machine for shearing long relatively narrow stock, the combination with continuously operated mechanism feeding such stock lengthwise, of a shearing tool revolvable across the line of stock-feed and having a normal position of rest on the downward side of its stroke a short distance away from the stock-line; a cooperating shearing-tool simultaneously reciprocable in the line of stock-feed and having a normal position of rest aft of its shearing position and movable forward in the direction of stock-feed to said shearing position while said revolvable tool is moving in said direction toward the stock-line; mechanism intermittently actuating said shearing tools simultaneously thru their said respective cycles from their said normal positions of rest and back thereto during the operation of said feeding mechanism; mechanism supporting the van of the stock fed beyond the shearing tools toward its position for shearing, said mechanism supporting said stock-van at least while on its way to its shearing position and during shearing and including hollow construction of one of said shearing tools and a long box alined therewith; means starting said shear-actuating mechanism and controlled by the stock-van during its feeding movement thru the box toward its supported shearing position therein, said starting means continuing under control of the stock-van on the supporting means at least until said van has been sheared off from the parent stock causing desired continuation of the operation of the shear-actuating mechanism, said box and hollow tool holding the stock on all sides in shearing position during shearing but including a laterally tiltable bottom; and mechanism operated by said shear-actuating mechanism and tilting said box-bottom discharging the sheared-off stock-van from its position on the supporting means wherein it continues control of said starting means, thereby discontinuing operation of said starting mechanism itself.

22. In a machine for shearing long relatively narrow stock, the combination with continuously operating mechanisum feeding such stock lengthwise, of normally stationary cooperating shearing tools; cooperating light-weight carriers for said tools one carrier being revolvable and revolving its tool in a plane including the line of stock-feed said carrier being mounted in position carrying its tool across said stock-line at an instant when the rates of forward movements of the tools and stock are substantially identical, the normal position of rest of the revolvable tool being on the downward side of its stroke a short distance away from the line of stock-feed and practically close thereto; normally stationary and relatively light-weight actuating mechanism for said carriers and tools and including relatively light-weight crank-arm-and-pin mechanism directly connected to the revolving carrier and revolving the latter and its tool; means supporting the van of the stock in feeding motion beyond the tools before shearing and including a long box alined with the long stock receiving it and holding it on all sides in shearing position during shearing; means starting said actuating mechanism and revolvable tool from their normal positions of rest for a single revolution of said tool, said starting means being controlled by the movement of the stock-van in its position maintained by said supporting means; said long box including a laterally tiltable bottom; and means operated by said actuating means and tilting said box-bottom discharging the sheared-off stock-van from said supporting means thereby discontinuing stock-control of the shear-actuating means itself.

23. In a machine for shearing relatively long narrow stock, the combination with continuously operating mechanism feeding such stock lengthwise, of normally stationary cooperating shearing-tools; cooperating light-weight carriers for said tools one carrier being revolvable and revolving its tool across the line of stock-feed said carrier being mounted in position carrying its tool across said line at an instant when the rates of forward movements of the tools and stock are substantially identical, the normal position of rest of the revolvable tool being on the downward side of its stroke a short distance away from the line of stock-feed and practically close thereto; normally stationary and relatively light-weight actuating mechanism for said carriers and tools; means supporting the van of the stock in feeding motion beyond the tools before shearing, and including a long box receiving long stock; means starting said actuating mechanism and revolvable tool from their normal positions of rest for a single revolution of said tool, said starting means being controlled by the movement of the stock-van in its position in said supporting box; said box holding the stock on all sides in shearing position during shearing but including a laterally tiltable bottom; means operated by said actuating means during the earlier portion of the operating cycle thereof and tilting said box-bottom discharging the sheared-off stock-van from said supporting means thereby discontinuing stock-control of the shear-actuating means itself; and mechanism operating after said stock-discharge and during idling of the actuating mechanism and tools after shearing and bringing them and said box bottom to rest in their normal positions at the ends of their cycles of operation.

24. A machine for shearing long relatively narrow steel stock into uniform sub-lengths and including a frame, continuously operative mechanism feeding such stock horizontally lengthwise, two normally stationary cooperating shearing tool-carriers and their tools of which one carrier is intermittently revolvable in a vertical plane along the path of the stock-feed over a distance short relative to the sheared sub-lengths; a crank-trunnion extending in a direction transversely of the stock-path toward a side of said revolvable carrier and connected thereto constituting the latter a lateral extension of the trunnion across the stock-path; and mechanism operating said feeding mechanism and said trunnion at coordinated rates, said mechanism including means intermittently revolving said trunnion and revolvable carrier around a cycle of a single revolution and said means including a stock-target and electrically operated means operated by said target and controlling the times of initiating movements of said trunnion and revolvable carrier from their normal positions of rest, said means quickly starting the tools upon operation by the target; the second tool-carrier having longitudinally sliding relations with the machine frame and including at least two portions extending vertically away from the stock-path and having vertically sliding relations with said revolvable carrier whereby operation of said target by the stock causes substantially instantaneous starting of the short horizontal reciprocations of said second carrier by way of said revolvable trunnion and carrier.

25. A machine for shearing long relatively narrow steel stock into uniform sub-lengths and including a frame, mechanism feeding such stock horizontally lengthwise, two normally stationary cooperating shearing-tool carriers and their tools of which one carrier is intermittently revolvable in a vertical plane along the path of stock-feed over a distance short relative to the sheared sub-lengths; a crank-trunnion extending in a direction transversely of the stock-path toward a side of said revolvable carrier and connected thereto constituting the latter a lateral extension of the trunnion across the stock-path; mechanism operating said feeding mechanism and said trunnion at coordinated rates, said mechanism including means intermittently revolving said trunnion and revolvable carrier around a cycle of a single revolution and said means including a stop-member, wedging rolls, electrically operated means operating said stop-member, and a trip controlling said operating means; the second tool-carrier having horizontally sliding relations with the machine frame and including means extending vertically away from the stock-path and having vertically slidable relations with said revolvable carrier whereby operation of said trip-member causes revolution of said trunnion and revolvable carrier and causes reciprocation by the latter of the second carrier.

26. A machine for shearing long relatively narrow steel stock into uniform sub-lengths of various desired lengths and including a frame, mechanism feeding such stock horizontally lengthwise, two cooperating shearing-tool-carriers and their tools of which one carrier is intermittently revolvable in a vertical plane along the path of stock-feed over a uniform distance short relative to the sheared sub-lengths; a crank-trunnion extending in a direction transversely of the stock-path toward a side of said carrier constituting the latter an extension of the trunnion across the stock-path; mechanism operating said feeding mechanism and said trunnion at coordinated rates, said mechanism including means intermittently revolving said crank-trunnion around a cycle of a single reciprocation; the second tool-carrier having horizontally sliding relations with the machine frame and including means extending vertically away from the stock-path and having vertically slidable relations with said revolvable carrier whereby revolution of said crank-trunnion and carrier causes reciprocation of the second carrier; and adjustable mechanism operated in coordination with the stock-feed and controlling the intermittent operations of said means revolving said crank-trunnion at times when uniform lengths of stock long relative to the short movements of the tools have been fed between and beyond the tools.

27. In a machine for shearing long relatively narrow stock into sub-lengths, the combination with continuously operative mechanism feeding such stock horizontally lengthwise, of shearing mechanism including a tool revolvable in a vertical plane along the line of stock-feed over a distance short relative to sheared sub-lengths of stock, and about a center above the line of stock-feed and movable downwardly across said line for shearing; a carrier for said tool; a crank-trunnion directly connected to said carrier and revolving it; actuating means intermittently revolving said trunnion but normally stationary in a position holding the revolving tool at rest in position above its shearing position; intermittently operated means controlling the start of said actuating means and coordinated with the feed of the stock by said feeding mechanism; and a second carrier and cooperating shearing tool, said second carrier being combined with said revolvable carrier in an arrangement wherein the intermittent revolutions of the first carrier by said direct connected crank trunnion cause reciprocation of the second carrier horizontally along the stock-path over the same short distance as the revolvable carrier relative to the sheared sub-lengths of stock.

28. A machine for shearing long relatively narrow steel stock into uniform sub-lengths of various desired lengths and including a frame, mechanism feeding such stock horizontally lengthwise, a shearing tool revolvable along the path of stock-feed over a uniform distance short relative to the sheared sub-lengths at all adjustments for different lengths of the various uniform sub-lengths; a revolvable carrier for said revolvable tool; a second carrier carrying said revolvable carrier and including at least two portions extending vertically away from the path of stock-feed and having vertically slidable relations with said revolvable carrier; a crank-trunnion extending in a direction transversely of the stock-path toward a side of the revolvable carrier and connected thereto and constituting an extension thereof laterally beyond the stock-path; said second carrier having horizontally sliding relations with the machine frame providing for the said short horizontal reciprocation of itself and its tool along the stock-path by said short revolutions of the first carrier by said crank-trunnion, said second or reciprocating tool operatively lying adjacent the revolvable tool and formed with a passage in alinement with the stock receiving the latter and riding back and forth along the stock during its short reciprocations and holding the stock in operative shearing position during shearing; mechanism operating said feeding mechanism and said shearing mechanism at coordinated rates, said mechanism including means revolving said crank-trunnion and thereby operating both said carriers and tools at varying rates over their said short movements, said revolving means being coordinated with the length of said short horizontal tool-movements causing passage of the revolvable tool in both directions across the stock-passage in the second or reciprocating tool at that instant of the short movements of the tools at varying rates when they both are moving forward with the stock at the same rate thereby providing for timely action on the steel stock; and adjustable mechanism determining various desired lengths of uniform sheared sub-lengths on different occasions, said mechanism being coordinated with the stock-feed and controlling the operation of said trunnion-revolving means causing successive instants of passage of said revolvable tool in both directions across the stock-passage in the second tool not only when the tools are moving forward with the stock at the same rate but at times when uniform lengths of the stock, long relative to the short horizontal movements of the tools, have been fed thru said tool-passage.

29. In a machine for shearing relatively long narrow stock into sub-lengths, the combination with continuously operated power mechanism feeding such stock lengthwise, of a revolvable tool-carrier and a shearing tool thereon both normally stationary in a position of the carrier above the line of stock-feed, the tool being revolvable by its carrier in the plane of said line of stock-feed over a distance short relative to the sheared sub-lengths, and downwardly below the stock-line for shearing; an actuating shaft also located with its center above the stock-line and extending in a direction transversely of said line; offset mechanism connected between said shaft and a side of said carrier and thereby intermittently imparting single substantially complete anti-clockwise shearing revolutions to the carrier and tool during the operation of said feeding mechanism, said revolutions having a radius short relative to the sheared stock sub-lengths, said shaft having a location relative to said stock-line causing shearing engagement of the tool with the stock at about seven-thirty o'clock of the anti-clockwise revolution of the carrier; mechanism driving said shaft at a rate coordinated with said continuously operated feeding mechanism; and a single adjustable member varying the frequency of the revolutions of said tool-carrier and thereby constituting the exclusive means for determining the length of the sheared stock sub-lengths.

30. In a machine for shearing long relatively narrow stock, the combination with continuously operated power mechanism feeding such stock lengthwise, of a tool-carrier and its shearing tool normally stationary at only one side of the line of stock-feed but the tool being revolvable in the plane of said line and across said line for shearing; an actuating shaft arranged with its center on the same side of the stock-line as said tool-carrier and extending in a direction transversely of said line; offset mechanism connected between said shaft and carrier and thereby imparting single substantially complete revolutions to the carrier and tool intermittently during the operation of said feeding mechanism, said revolutions having a radius short relative to the sheared stock sub-lengths; electrically operated means controlling the times of intermittent operation of said actuating shaft; and an adjustable target operated by the feeding movements of the stock and determining the times of operation of said electrical means said target varying the frequency of the revolutions of said revolvable tool-carrier and thereby constituting the exclusive means of adjustment for the different lengths of the sheared stock sub-lengths.

31. In a machine for shearing long relatively narrow stock, the combination with continuously operated power mechanism feeding such stock lengthwise, of a tool-carrier and its shearing tool normally stationary at only one side of the line of stock-feed but the tool being revolvable in the plane of said line and across said line for shearing; an intermittently operated actuating shaft arranged with its center on the same side of the stock-line as said tool and carrier and extending in a direction transversely of said line; offset mechanism connected between said carrier and shaft and thereby intermittently imparting single substantially complete revolutions to the carrier and tool during the operation of said feeding mechanism, said revolutions having a radius short relative to the sheared stock sub-lengths, a clutch intermittently rotating said actuating shaft, clutch-starting mechanism including an adjustable target operated by the feeding movement of the stock and varying the frequency of the revolution of said carrier thereby constituting the exclusive means of determining the length of the sheared stock sub-lengths; and mechanism driving the driving member of said clutch at a rate coordinated with said continuously operated feeding mechanism.

32. In a machine for shearing long relatively narrow stock, the combination with continuously operated power mechanism feeding such stock lengthwise, of a tool-carrier and its shearing tool normally stationary at only one side of the line of stock-feed; an intermittently operated actuating shaft arranged with its center on the same side of the stock-line as said tool and carrier and extending in a direction transversely of the tool; off-set mechanism connected between said carrier and shaft and intermittently imparting single substantially complete revolutions to the carrier and tool during the operation of said feeding mechanism, a clutch intermittently rotating said actuating shaft, electrical means energized during the operation of said feeding mechanism and causing quick engagement of the clutch members; and mechanism driving the driving member of said clutch at a rate coordinated with said continuously operated feeding mechanism.

33. In a machine for shearing long relatively narrow stock into sub-lengths, the combination with continuously operative mechanism feeding such stock lengthwise, of a tool-carrier and its shearing tool normally stationary at only one side of the path of stock-feed but the tool being revolvable by its carrier in the plane of said path; an actuating shaft; a crank mechanism connected between said shaft and a side of said carrier and intermittently imparting single substantially complete revolutions to the carrier and tool during the operation of said feeding mechanism, a second carrier intermittently operated by the intermittent revolutions of said first carrier, and carrying a cooperating shearing tool; a clutch intermittently rotating said actuating shaft; and a single adjustable means constituting the exclusive means for determining different lengths of sub-lengths.

34. In a machine for shearing long relatively narrow stock into sub-lengths, the combination with continuously operative mechanism feeding such stock lengthwise, of a tool carrier and shearing tool normally stationary at substantially only one side of the line of stock-feed; an intermittently rotated actuating shaft; a crank trunnion connecting said shaft directly to one side of said carrier and intermittently imparting single substantially complete revolutions to the carrier and tool during the operation of said feeding mechanism, a second carrier intermittently reciprocated along the stock-path by means of the intermittent revolutions of the first carrier, the movements of both carriers along the stock-path being short relative to the sheared sub-lengths; a cooperating shearing tool carried by said second carrier; and a clutch intermittently rotating said actuating shaft.

35. In a machine for shearing long relatively narrow stock into sub-lengths, the combination with mechanism feeding such stock horizontally lengthwise, of shearing mechanism operated intermittently during the operation of said continuous stock-feeding mechanism, said shearing mechanism being reciprocable along the stock-path over a distance short relative to the sheared sub-lengths and including two shearing tools and carriers therefor one of said tools being formed hollow to receive the stock and hold it in shearing position; a long box-shaped stock support and guide alined with said hollow tool receiving the advancing stock and cooperating with said tool in holding the stock at its top, sides and bottom in position during shearing; said box-shaped member being formed with a longitudinally extending top opening and having its bottom portion movable for gravity discharge of sheared sub-lengths; a stock-target including a portion projecting down thru said top opening of the box-member into the path of the stock advancing thru the hollow tool and the alined box; said target and box being cooperatively constructed for support of the target on the box in slidable relation of the target along the top of the box longitudinally of the stock for pre-determination of desired lengths of sheared sub-lengths; means securing the target in fixed adjusted relation to the box; mechanism operating said shearing mechanism and box-bottom for shearing and discharge of sheared sub-lengths; and means operated by movement of the stock-van, for moving the target-portion projecting into the box, and controlling the operation of said operating mechanism.

36. In a machine for shearing long relatively narrow stock, the combination with continuously operated mechanism feeding such stock lengthwise, of a normally stationary revolvable shearing tool; actuating mechanism imparting single substantially complete revolutions to said tool intermittently during the operation of said feeding mechanism; a target-control normally lying in out-of-control position in the path of the van of the unsheared feeding stock and movable thereby out of its path into a position controlling the starting of said actuating mechanism causing almost immediate shearing of the stock-van; means supporting the stock-van in shearing position in the path of the stock-feed after movement of the target-control to its said control position; means providing for momentary continued advance of the stock-van and maintenance of the target control in its operative position after the stock-van has started moving the target-control and at least until shearing off of the sub-length; and mechanism operated by said actuating mechanism and causing movement of the sheared-off stock-van out of the path of the moving parent stock and away from the target control before the completion of said single revolution of the shearing tool.

37. In a machine for shearing long relatively narrow stock into sub-lengths, the combination with continuously operated mechanism feeding such stock lengthwise, of a normally stationary shearing tool revolvable in a plane including the path of stock-feed and in a circle crossing said line for shearing, said revolvable shearing tool having a radius of revolution short relative to the sheared sub-lengths of stock; actuating mechanism imparting single substantially complete revolutions to said tool during the operation of said feeding mechanism; a target-control normally lying in the path of the van of the feeding unsheared stock and movable thereby and starting said actuating mechanism causing substantially immediate shearing of the stock-van; means supporting the stock-van in shearing position in the path of stock-feed after movement of said target control out of said path thereby preventing unduly quick return of the target-control to its normal position; mechanism operated by said actuating mechanism also controlled by the target before its return to its normal position in the stock-path and causing movement of the sheared-off stock-van out of the path of the moving parent stock and away from the target-control discharging the sheared sub-length before the completion of said single revolution of the shearing tool back to its normal position of rest; and means moving the target back into its normal position after said discharge of the sub-length.

38. In a machine for shearing long relatively narrow stock into sub-lengths, the combination with continuously operated mechanism feeding such stock lengthwise, of shearing mechanism intermittently operated during the operation of said feeding mechanism and in coordinated time relation therewith said mechanism including a hollow tool receiving and supporting the stock in shearing position; a clutch controlling the operation of said shearing mechanism; means cooperating with said hollow tool in supporting in shearing position a portion of the stock advanced forwardly beyond the shearing mechanism, said means including a long box alined with said hollow tool, having a longitudinal top slot and a laterally tilting bottom; a clutch-controlling target mounted on said box over its top slot and having a movable portion normally extending thru the slot in the path of the stock for movement thereby initiating the operation of the clutch and shearing mechanism; and means coordinated in time-relation with the shearing mechanism, controlled by the target, and discharging the sheared sub-length of stock from said stock-supporting means by tilting said box-bottom, thereby causing said sub-length to drop from out of its supporting box and from the path of the parent stock continuously advancing thru the hollow tool and alined box.

39. In a machine for shearing long relatively narrow stock into sub-lengths, the combination with mechanism feeding such stock continuously lengthwise, of a normally stationary tool-carrier reciprocable along the line of stock-feed; a cooperating normally stationary tool-carrier and a shearing-tool thereon and revolvable thereby in the plane of said stock-line; said carriers being intermittently operable over a distance along the stock-path short relative to the sheared sub-lengths; said reciprocable carrier including carrier guides in slidable engagement with the revolvable carrier; said revolvable carrier having its position of rest on one side of the stock-line; crank-pins located at opposite ends of the revolvable carrier, alined with one another and directly connected to it to revolve it and thereby reciprocating the cooperating carrier; shear-shafts alined with one another and supporting and revolving said crank-pins; a normally stationary clutch-shaft and driving mechanism between it and said shear-shafts; a clutch; a brake; said crank-pins and shear-shafts, clutch-shaft, clutch and brake being arranged to impart a single substantially complete revolution to said revolvable carrier and tool; and a target operated by the moving stock and controlling the tripping of the clutch.

40. In a machine for shearing long relatively narrow stock into sheared sub-lengths, the combination with continuously operated mechanism feeding such stock lengthwise, of a normally stationary shearing-tool-carrier reciprocable in line with the stock-feed, a cooperating shearing-tool-carrier constituting the sole means of reciprocating said first carrier and itself normally stationary at one side of the stock, said carriers being movable together along the stock path over a distance short relative to the sheared sub-lengths; actuating mechanism including a clutch intermittently, during the operation of said feeding mechanism, revolving said cooperating carrier in a plane paralleling said feed-line thereby moving both carriers along their short paths along the stock-path; and a movable target normally lying in the path of stock-feed and operated by the feeding movement of the stock and controlling the times of operation of said clutch and actuating mechanism.

41. A machine for shearing long relatively narrow steel stock into sub-lengths and including shearing mechanism reciprocable horizontally along the path of stock feed over a distance short relative to the sheared sub-lengths; mechanism including a clutch and stock-target clutch-trip intermittently effecting such short reciprocations; a main driver for the driving member of said clutch; mechanism feeding said stock horizontally lengthwise; said shearing mechanism including two shearing-tool carriers having moving relation with one another, and one moving vertically and the other moving horizontally; mechanism between said main driven and feeding mechanism causing a rate of stock feed coordinated with the rate of shear-operation; said mechanism which operates said shearing-mechanism including a shaft and a crank-trunnion having one end directly connected to said vertically movable tool-carrier, whereby revolution of the driven member of the clutch, said shaft and said crank-trunnion causes revolution of said tool-carrier and horizontal reciprocation of said cooperating carrier.

42. In a machine for shearing long relatively narrow stock into sub-lengths, the combination with continuously operated mechanism feeding such stock lengthwise, of intermittently operating shearing mechanism including a shearing-tool-carrier revolvable in the plane of the feeding path of the stock and carrying its tool over a distance along the stock-path short relative to the sheared sub-lengths; a clutch-shaft; a clutch; a crank-pin operated by said clutch-shaft and connected directly with and revolving said tool-carrier; and a main driver operating said feeding mechanism and said clutch in coordinated time relation.

43. In a machine for shearing long, relatively narrow stock into sub-lengths, the combination with continuously operative mechanism feeding such stock lengthwise, of a revolvable shearing-tool-carrier extending transversely of the stock and normally stationary in a position substantially above the stock but intermittently revolvable in a plane along the length of the stock reciprocating its tool intermittently over a distance short relative to the sheared sub-lengths; shear-operating mechanism including a member located in a plane above the stock namely on the same side thereof as said carrier and extending transversely to a side of the transversely extending carrier, and connected to said side and revolving the carrier; and mechanism intermittently operating said member.

44. In a machine for shearing long relatively narrow steel stock, the combination with continuously operating mechanism feeding such stock lengthwise, of a shearing tool perforated for stock-passage and intermittently reciprocable in the line of stock-feed for movements relative to the stock in both directions of reciprocation of the tool during the continuous operation of the stock-feeding mechanism, the stock being held in said stock-passage by said tool in shearing position during shearing; a cooperating shearing-tool imperforate for stock and normally at rest on one side of the stock-line; a reciprocable carrier for said reciprocable perforated tool, and a carrier for the cooperating imperforate tool which is revolvable in a plane along the path of the continuously moving stock; means including sliding relations between the carriers causing the revolution of the revolving tool-carrier to reciprocate the reciprocable tool-carrier; a shear-shaft; a crank-pin operated by the shear-shaft and directly connected to and revolving the imperforate tool-carrier; and means intermittently rotating said shear-shaft.

45. In a machine for shearing long relatively narrow stock into sub-lengths, the combination with continuously operated mechanism feeding such stock lengthwise, of shearing mechanism intermittently reciprocable along the path of the continuously moving stock over a distance short relative to the sheared sub-length, said mechanism including a revolvable shearing-tool-carrier normally in stationary position located at one side of the stock, two short shear-shafts both located on the same side of the stock as the revolvable carrier but respectively located on opposite sides of said carrier and extending in directions transversely of the line of stock-feed; a clutch intermittently rotating said shear shafts; connections between the shear-shafts respectively and the opposite sides of the revolvable carrier which translate the rotary motions of said shear-shafts into revolutionary motions of the carrier; and means intermittently operating said clutch in coordinated relations with said continuously operated stock-feeding means.

46. A machine for shearing long relatively narrow steel stock into sub-lengths of uniform lengths, and intermittently operated shearing mechanism including a carrier and tool movable along the stock-length over a short distance relative to the sheared sub-lengths, a cooperating revolvable carrier and tool participating in said movements of the first carrier; and means intermittently imparting said movements to said tools and including driving and driven clutch members and a main driver operating said feeding means and the driving member of the clutch in coordinated time relation, and means acting between the driven member of the clutch and said shearing tools and causing timely operation thereof on the continuously moving stock to shear uniform sub-lengths, said means including braking means and an arrangement of the carriers providing for a normal position of rest of said revolvable tool substantially above its stock-shearing position, a target in the path of the moving stock, and means operated by the target and effecting shearing action of the tools promptly after target operation, in cooperation with said normal position of rest of the revolving tool, said means including wedging rolls between the driving and driven clutch-members, an electromagnet operating said rolls, and an electrical switch controlling said electromagnet; and mechanism coordinated with said shearing mechanism and disengaging said rolls after completion of shearing action of the tools and before the revolving tool moving upward against the action of the braking means and gravity, has reached its said normal position of rest above the stock.

47. A machine of the general character described for shearing long relatively narrow steel stock into sub-lengths and including a plurality of stock-treating units including at least two successive feeding mechanisms, and shearing and discharging mechanisms; a common driver for all said units; a clutch between said driver and said shearing and discharging mechanisms, the feeding mechanisms being continuously operated by said common driver; a worm-shaft and worm-gear speed reduction unit between the main driver and one of the feeding mechanisms; and a worm shaft and worm-gear speed-reduction unit, between the main driver on the one hand and another of the feeding mechanisms and the shearing and discharging mechanisms on the other hand.

48. In a machine for shearing long relatively narrow strip-steel stock into sub-lengths, the combination with continuously operating mechanism feeding such stock lengthwise, of normally stationary cooperating shearing tools one of which is revolvable and both of which are movable along the stock path over a distance short relative to the sheared sub-lengths; carriers therefor; normally stationary crank-arm-and-pin mechanism operating intermittently, directly connected to said revolvable tool-carrier and carrying the revolvable tool across the line of stock-feed during the few degrees of its revolution when the like rate of motion of both tools in the direction of stock-feed is nearest to the rate of operation of said feeding mechanism; said carriers having an intersliding relation whereby the revolution of said crank mechanism causes reciprocation by the revolving carrier of the other carrier; and means controlled by the feeding movement of the stock and in turn controlling the times of intermittent operation of said tool-operating mechanism.

JOSEPH H. ROBERTS.